US008036998B2

(12) United States Patent
Kasai

(10) Patent No.: US 8,036,998 B2
(45) Date of Patent: Oct. 11, 2011

(54) CATEGORY CLASSIFICATION METHOD

(75) Inventor: Tsuneo Kasai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 698 days.

(21) Appl. No.: 12/190,489

(22) Filed: Aug. 12, 2008

(65) Prior Publication Data

US 2009/0063374 A1 Mar. 5, 2009

(30) Foreign Application Priority Data

Aug. 31, 2007 (JP) .................. 2007-226581

(51) Int. Cl.
*G06E 1/00* (2006.01)
*G06E 3/00* (2006.01)
*G06F 15/18* (2006.01)
*G06G 7/00* (2006.01)
(52) U.S. Cl. .......................... 706/20; 706/12
(58) Field of Classification Search .................. None
See application file for complete search history.

(56) References Cited

U.S. PATENT DOCUMENTS

| 7,490,071 | B2 * | 2/2009 | Milenova et al. ............. 706/45 |
| 2005/0251347 | A1 * | 11/2005 | Perona et al. .................. 702/19 |
| 2008/0243735 | A1 * | 10/2008 | Rish et al. .................... 706/17 |
| 2009/0171697 | A1 * | 7/2009 | Glauser et al. ................ 705/3 |

FOREIGN PATENT DOCUMENTS

| JP | 2002-314831 | 10/2002 |
| JP | 2002-314937 | 10/2002 |
| JP | 2002-344881 | 11/2002 |
| JP | 2002-344989 | 11/2002 |
| JP | 2003-006666 | 1/2003 |
| JP | 2003-052002 | 2/2003 |
| JP | 2003-060935 | 2/2003 |
| JP | 2003-101940 | 4/2003 |
| JP | 2003-348343 | 12/2003 |
| JP | 2004-082703 | 3/2004 |
| JP | 2004-112756 | 4/2004 |
| JP | 2004-215311 | 7/2004 |
| JP | 2005-134966 | 5/2005 |
| JP | 2007-194917 | 8/2007 |
| JP | 2007228118 | 9/2007 |
| WO | WO 03/036960 A1 | 5/2003 |

* cited by examiner

*Primary Examiner* — Omar Fernandez Rivas
*Assistant Examiner* — Daniel Pellett
(74) *Attorney, Agent, or Firm* — DLA Piper LLP (US)

(57) ABSTRACT

A category classification method includes: calculating function values corresponding to a relationship between a classification target and support vectors that contribute to a classification boundary, calculating an addition value in which the function value for each support vector has been added, and classifying that the classification target does not pertain to a specific category in case that the addition value is smaller than a threshold, wherein calculation of the addition value is carried out by adding function values having positive values, then adding function values having negative values, and the classification target is classified as not pertaining to the specific category, without adding the remaining function values, in case that the addition value has become smaller than the threshold.

9 Claims, 21 Drawing Sheets

| SCENE | ITEM-BY-ITEM ENHANCEMENT DETAILS ||||||| MEMORY COLOR |||| NOISE REMOVAL |
|---|---|---|---|---|---|---|---|---|---|---|---|
| | CONTRAST | BRIGHTNESS | COLOR BALANCE | SATURATION | SHARPNESS | | SKYBLUE | GREEN | SKIN | RED | |
| WITHOUT ENHANCEMENT | OFF | OFF | OFF | OFF | OFF | | OFF | OFF | OFF | OFF | OFF |
| OTHER | NORMAL | NORMAL | NORMAL | NORMAL | NORMAL | | OFF | OFF | OFF | OFF | OFF |
| PORTRAIT | SLIGHTLY SOFT | SLIGHTLY BRIGHT | NORMAL | SLIGHTLY WEAK | SLIGHTLY WEAK | | OFF | OFF | ON | OFF | OFF |
| LANDSCAPE | SLIGHTLY SHARP | SLIGHTLY DARK | NORMAL | SLIGHTLY HIGH | SLIGHTLY STRONG | | ON | ON | OFF | OFF | OFF |
| SUNSET SCENE | NORMAL | OFF | WARM TONE | NORMAL | SLIGHTLY WEAK | | OFF | OFF | OFF | ON | ON |
| NIGHT SCENE | NORMAL | DARK | OFF | NORMAL | NORMAL | | OFF | OFF | OFF | OFF | ON |
| FLOWER | SLIGHTLY SOFT | SLIGHTLY DARK | WEAK | SLIGHTLY HIGH | NORMAL | | OFF | ON | OFF | OFF | OFF |
| AUTUMNAL | NORMAL | NORMAL | NORMAL | SLIGHTLY HIGH | SLIGHTLY STRONG | | OFF | OFF | OFF | ON | OFF |

FIG. 4

|          | LANDSCAPE | SUNSET SCENE | NIGHT SCENE | FLOWER | AUTUMNAL |
|----------|-----------|--------------|-------------|--------|----------|
| POSITIVE | o         | o            | o           | o      | o        |
| NEGATIVE | o         | o            | o           | o      | o        |

|  | LANDSCAPE | SUNSET SCENE | NIGHT SCENE | FLOWER | AUTUMNAL |
|---|---|---|---|---|---|
| POSITIVE THRESHOLD | 1.27 | 2.99 | 1.14 | 1.43 | 0.54 |
| FIRST NEGATIVE THRESHOLD | −1.10 | −2.00 | −1.27 | −1.90 | −1.84 |
| SECOND NEGATIVE THRESHOLD | | | | | |
| LANDSCAPE | — | −0.75 | −0.73 | −0.58 | −0.64 |
| SUNSET SCENE | 1.68 | — | 1.30 | −0.49 | −0.61 |
| NIGHT SCENE | −0.45 | −0.61 | — | −0.63 | −0.71 |
| FLOWER | 1.79 | −0.66 | −0.57 | — | −0.23 |
| AUTUMNAL | 1.60 | −0.62 | −0.64 | 0.01 | — |

FIG. 13A

POSITIVE THRESHOLD

| LANDSCAPE | DISCRIMINANT > 1.27 |
|---|---|

⇒ DETERMINE SCENE

NEGATIVE THRESHOLD

| LANDSCAPE | DISCRIMINANT < −1.10 |
|---|---|
| SUNSET SCENE | DISCRIMINANT > 1.68 |
| NIGHT SCENE | DISCRIMINANT > −0.45 |
| FLOWER | DISCRIMINANT > 1.79 |
| AUTUMNAL | DISCRIMINANT > 1.60 |

⇒ ELIMINATE SCENE

FIG. 13B

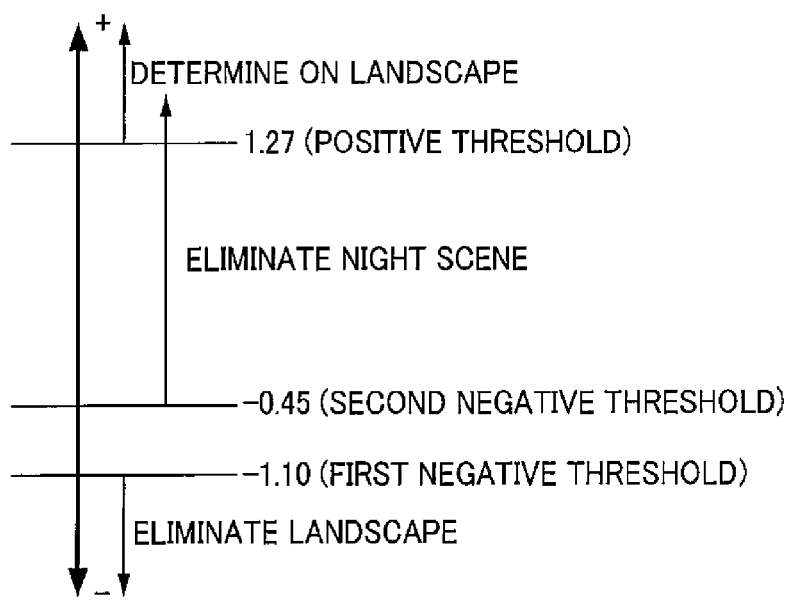

FIG. 13C

| WEIGHT FACTOR | | CHARACTERISTIC AMOUNT (yij) OF SUPPORT VECTOR |
|---|---|---|
| SIGN | VALUE | |
| + | $W_1$ | $y_{11}, y_{12}, y_{13} \cdots$ |
| − | $W_2$ | $y_{21}, y_{22}, y_{23} \cdots$ |
| + | $W_3$ | $y_{31}, y_{32}, y_{33} \cdots$ |
| − | $W_4$ | $y_{41}, y_{42}, y_{43} \cdots$ |
| + | $W_5$ | $y_{51}, y_{52}, y_{53} \cdots$ |
| − | $W_6$ | $y_{61}, y_{62}, y_{63} \cdots$ |
| ⋮ | ⋮ | ⋮ |

FIG. 19A

| WEIGHT FACTOR | | CHARACTERISTIC AMOUNT (yij) OF SUPPORT VECTOR |
|---|---|---|
| SIGN | VALUE | |
| + | $W_5$ | $y_{51}, y_{52}, y_{53} \cdots$ |
| + | $W_3$ | $y_{31}, y_{32}, y_{33} \cdots$ |
| + | $W_1$ | $y_{11}, y_{12}, y_{13} \cdots$ |
| ⋮ | ⋮ | ⋮ |
| − | $W_2$ | $y_{21}, y_{22}, y_{23} \cdots$ |
| − | $W_4$ | $y_{41}, y_{42}, y_{43} \cdots$ |
| − | $W_6$ | $y_{61}, y_{62}, y_{63} \cdots$ |
| ⋮ | ⋮ | ⋮ |

⇑ POSITIVE WEIGHT FACTORS

⇓ NEGATIVE WEIGHT FACTORS

FIG. 19B

CATEGORY CLASSIFICATION METHOD

CROSS-REFERENCE TO RELATED APPLICATIONS

The present application claims priority upon Japanese Patent Application No. 2007-226581 filed on Aug. 31, 2007, which is herein incorporated by reference.

BACKGROUND

1. Technical Field

The present invention relates to category classification methods.

2. Related Art

Conventionally, classification methods that use support vector machines (for example, see JP-A-2005-134966) are known as classification methods for categories such as scenes or the like of images. With support vector machines, support vectors that contribute to classification boundaries are obtained through learning using samples for learning. And discriminants are calculated through computations based on relationships between classification targets and each support vector. By comparing values of the discriminants and threshold values, classification is carried out as to whether or not a classification target pertains to a specific category.

In classification processing using support vector machines, the accuracy of classification can be improved by using more learning samples, that is, by using a greater number of support vectors. In this regard, as is described later, the time for calculating discriminants according to support vector machines is proportional to the number of support vectors. That is, when the number of support vectors is increased to improve the accuracy of classification, the time required to calculate the discriminants increases, thereby reducing the speed of classification processing. Thus, conventionally, there is a problem in that it has been difficult to improve the speed of classification processing.

SUMMARY

The invention has been devised in light of above-described issue, and it is an advantage thereof to improve the speed of classification processing.

A primary aspect of the invention for achieving this object involves a category classification method including: calculating function values corresponding to a relationship between a classification target and support vectors that contribute to a classification boundary, calculating an addition value in which the function value for each support vector has been added, and classifying that the classification target does not pertain to a specific category in case that the addition value is smaller than a threshold, wherein calculation of the addition value is carried out by adding function values having positive values, then adding function values having negative values, and the classification target is classified as not pertaining to the specific category, without adding the remaining function values, in case that the addition value has become smaller than the threshold.

Other features of the invention will become clear through the accompanying drawings and the following description.

BRIEF DESCRIPTION OF THE DRAWINGS

For a more complete understanding of the invention and the advantages thereof, reference is now made to the following description taken in conjunction with the accompanying drawings wherein:

FIG. 4 is an explanatory diagram of a relationship between scenes of images and enhancement details;

FIG. 13A is an explanatory diagram of a threshold table, FIG. 13B is an explanatory diagram of thresholds in a landscape classifier, FIG. 13C is an explanatory diagram of an outline of processing by the landscape classifier;

FIG. 19A is a diagram showing a classification table used in the calculations of support vector machines, FIG. 19B is a diagram showing a state in which the classification table of FIG. 19A has been sorted in order of larger weight factors;

DESCRIPTION OF EXEMPLARY EMBODIMENTS

Figure 1:
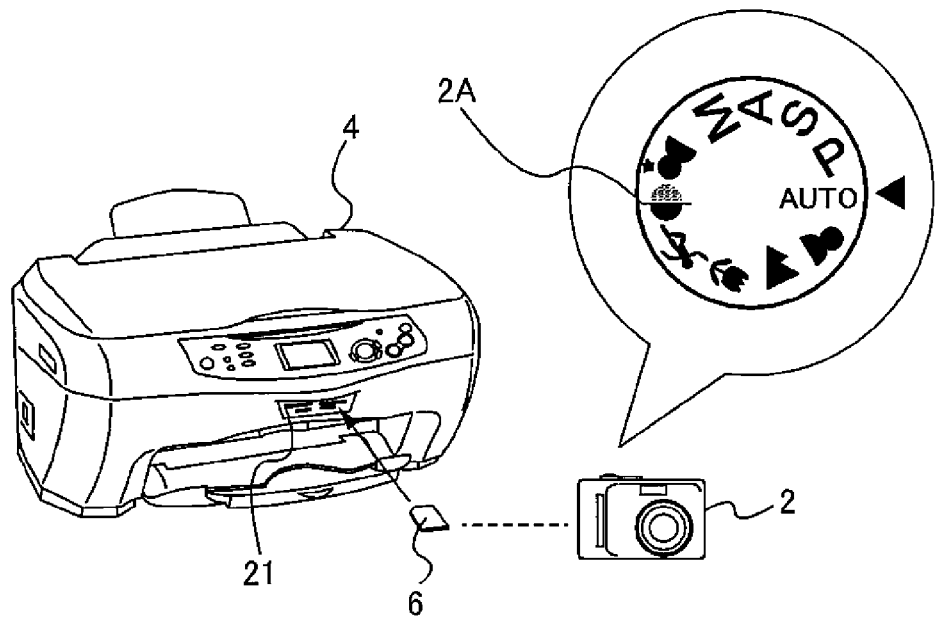
FIG. 1 is an explanatory diagram illustrating an image processing system.

At least the following matters will be made clear by the explanation in the present specification and the description of the accompanying drawings.

Namely, a category classification method will be made clear that includes: calculating function values corresponding to a relationship between a classification target and support vectors that contribute to a classification boundary, calculating an addition value in which the function value for each support vector has been added, and classifying that the classification target does not pertain to a specific category in case that the addition value is smaller than a threshold, wherein calculation of the addition value is carried out by adding function values having positive values, then adding function values having negative values, and the classification target is classified as not pertaining to the specific category, without adding the remaining function values, in case that the addition value has become smaller than the threshold.

With this category classification method, the speed of classification processing can be improved.

In this category classification method, it is desirable that a determination is performed as to whether or not the function value to be added to the addition value is a negative value, and the classification target is classified as not pertaining to the specific category in case that the function value is a negative value and the addition value has become smaller than the threshold.

In this category classification method, it is desirable that the function values having negative values are added to the addition value in order from those having larger absolute values.

With this category classification method, the speed of classification processing can be further improved.

Furthermore, a category classification method will be made clear that includes: calculating function values corresponding to a relationship between a classification target and support vectors that contribute to a classification boundary, calculating an addition value in which the function value for each support vector has been added, and classifying that the classification target pertains to a specific category in case that the addition value is larger than a threshold, wherein calculation of the addition value is carried out by adding function values having positive values, then adding function values having negative values, and it is determined that the classification target cannot be classified as pertaining to the specific category, without adding the remaining function values, in case that the addition value has become equal to or lower than the threshold.

With this category classification method, the speed of classification processing can be improved.

In this category classification method, it is desirable that a determination is performed as to whether or not the function value to be added to the addition value is a negative value, and a determination is made that the classification target cannot be classified as pertaining to the specific category in case that the function value is a negative value and the addition value has become equal to or less than the threshold.

In this category classification method, it is desirable that the function values having negative values are added to the addition value in order from those having larger absolute values.

With this category classification method, the speed of classification processing can be further improved.

Furthermore, a category classification method will be made clear that includes: calculating function values corresponding to a relationship between a classification target and support vectors that contribute to a classification boundary, calculating an addition value in which the function value for each support vector has been added, and classifying that the classification target pertains to a specific category in case that the addition value is larger than a threshold, wherein calculation of the addition value is carried out by adding function values having negative values, then adding function values having positive values, and the classification target is classified as pertaining to the specific category, without adding the remaining function values, in case that the addition value has become larger than the threshold.

With this category classification method, the speed of classification processing can be improved.

In this category classification method, it is desirable that a determination is performed as to whether or not the function value to be added to the addition value is a positive value, and the classification target is classified as pertaining to the specific category in case that the function value is a positive value and the addition value has become larger than the threshold.

In this category classification method, it is desirable that the function values having positive values are added to the addition value in order from those having larger absolute values.

With this category classification method, the speed of classification processing can be further improved.

Overall Configuration

FIG. 1 is an explanatory diagram of an image processing system. This image processing system includes a digital still camera 2 and a printer 4.

The digital still camera 2 captures a digital image by forming an image of a photographic subject onto a digital device (such as a CCD). The digital still camera 2 is provided with a mode setting dial 2A. With this mode setting dial 2A, the user can set shooting modes in accordance with the shooting conditions. For example, when the mode setting dial 2A is set to the "night scene" mode, the digital still camera 2 reduces the shutter speed or increases the ISO sensitivity to take a picture with shooting conditions suitable for photographing a night scene.

The digital still camera 2 saves the image file generated by the image-taking to a memory card 6 in conformity with the file format specifications. The image file contains not only the digital data (image data) of the captured image, but also supplemental data, such as the shooting conditions (shooting data), when the picture was shot.

The printer 4 is a printing apparatus that prints an image represented by the image data on paper. The printer 4 is provided with a slot 21 into which the memory card 6 is inserted. After taking a picture with the digital still camera 2, the user can remove the memory card 6 from the digital still camera 2 and insert the memory card 6 into the slot 21.

Figure 2:
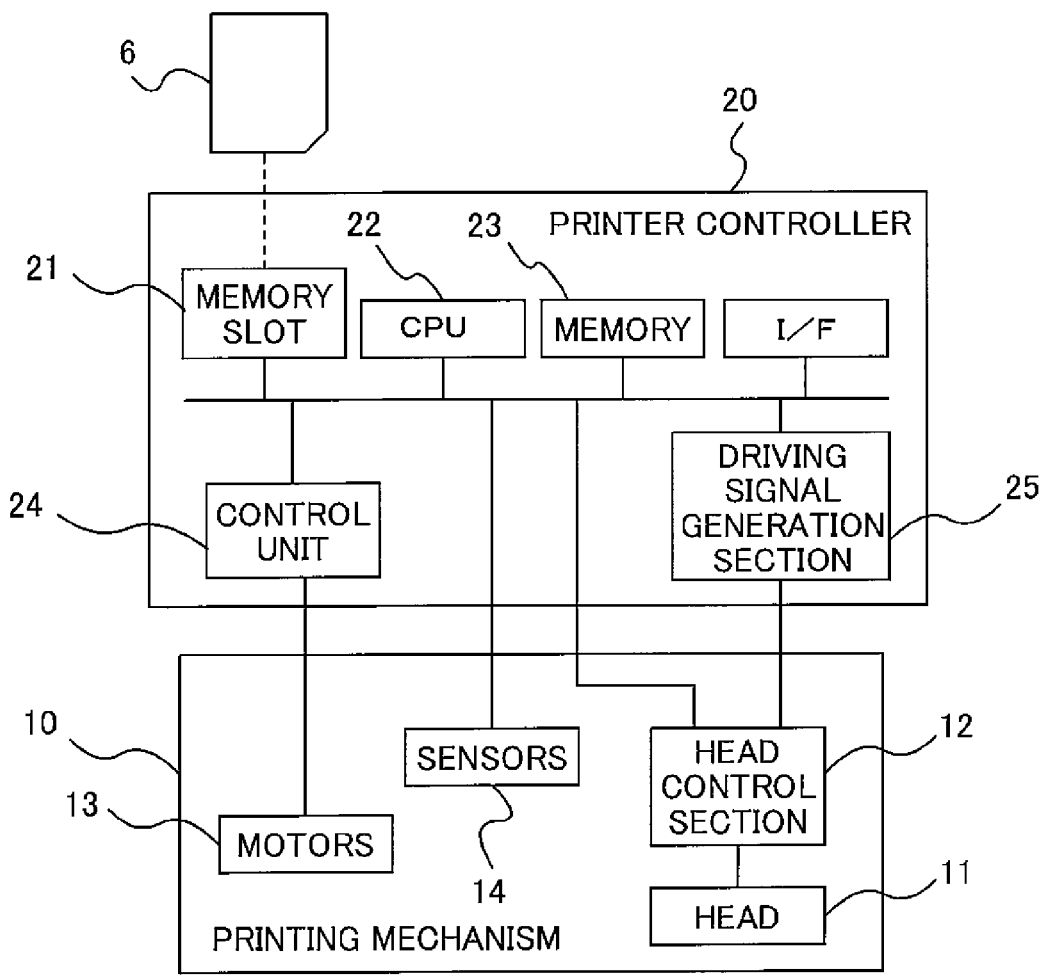
FIG. 2 is an explanatory diagram of the configuration of a printer.

FIG. 2 is an explanatory diagram of a configuration of the printer 4. The printer 4 includes a printing mechanism 10 and a printer controller 20 for controlling the printing mechanism 10. The printing mechanism 10 includes a head 11 that ejects ink, a head control section 12 that controls the head 11, motors 13 for, for example, transporting paper, and sensors 14. The printer controller 20 includes the memory slot 21 for sending/receiving data to/from the memory card 6, a CPU 22, a memory 23, a control unit 24 that controls the motors 13, and a driving signal generation section 25 that generates driving signals (driving waveforms).

When the memory card 6 is inserted into the slot 21, the printer controller 20 reads out the image file saved on the memory card 6 and stores the image file in the memory 23. Then, the printer controller 20 converts the image data of the image files into print data to be printed by the printing mechanism 10 and controls the printing mechanism 10 based on the print data to print the images on paper. This sequence of operations is called "direct printing."

It should be noted that "direct printing" is performed not only by inserting the memory card 6 into the slot 21, but also can be performed by connecting the digital still camera 2 to the printer 4 via a cable (not shown).

Outline of Automatic Enhancement Function

When "portrait" pictures are printed, it is often desirable to improve the skin tones. Moreover, when "landscape" pictures are printed, it is often desirable that the blue color of the sky be emphasized and the green color of trees and plants be emphasized. Thus, the printer 4 of the present embodiment has an automatic enhancement function of analyzing the image file and automatically performing appropriate enhancement processing.

Figure 3:
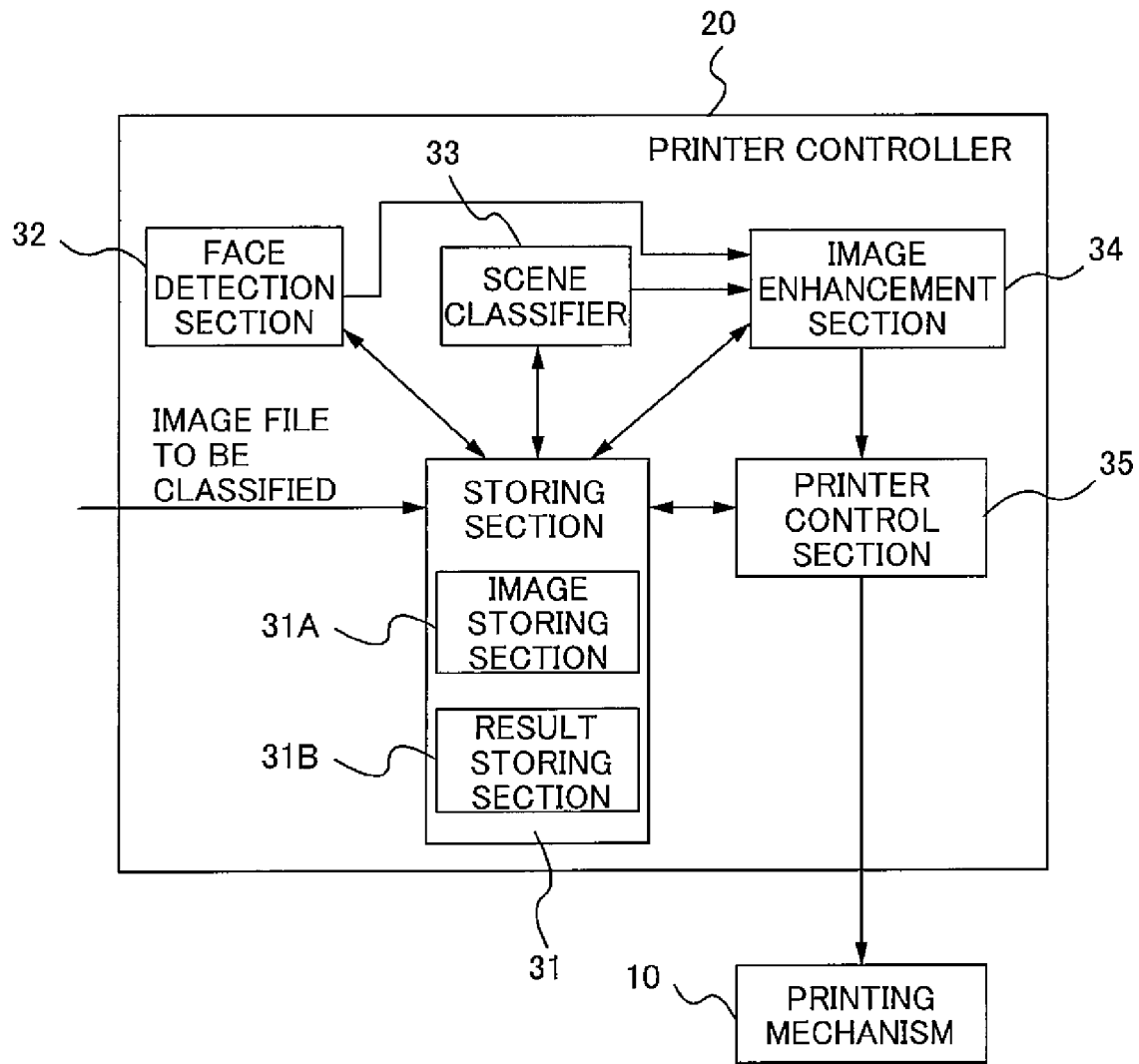
FIG. 3 is an explanatory diagram of an automatic enhancement function of a printer.

FIG. 3 is an explanatory diagram of the automatic enhancement function of the printer 4. The components of the printer controller 20 in the diagram are realized with software and hardware.

A storing section 31 is realized with a certain area of the memory 23 and the CPU 22. Image data of the image file that has been read out from the memory card 6 is decoded in an image storing section 31A of the storing section 31. The results of the calculations performed by the components of the printer controller 20 are stored in a result storing section 31B of the storing section 31.

A face detection section 32 is realized with the CPU 22 and a face detection program stored in the memory 23. The face detection section 32 analyzes the image data stored in the image storing section 31A and confirms whether or not there is a human face. If the face detection section 32 classifies that there is a human face, the image to be classified is classified as belonging to "portrait" scenes. In this case, scene classification processing with the scene classifier 33 is not performed. Since the face detection processing performed by the face detection section 32 is similar to processing that is already widespread, a detailed description thereof is omitted.

The scene classifier 33 is realized with the CPU 22 and a scene classification program stored in the memory 23. The scene classifier 33 analyzes the image file stored in the image storing section 31A and classifies the scene of the image represented by the image data. Scene classification processing with the scene classifier 33 is performed in the case where it has been classified with the face detection section 32 that a face is not present (it is not a "portrait" scene). As described later, the scene classifier 33 determines which of "landscape," "sunset scene," "night scene," "flower," "autumnal," and "other" the image to be classified is classified as.

FIG. 4 is an explanatory diagram of the relationship between scenes of images and enhancement details.

An image enhancement section 34 is realized with the CPU 22 and an image enhancement program stored in the memory 23. The image enhancement section 34 enhances the image data in the image storing section 31A based on the classification result (result of classification performed by the face detection section 32 or the scene classifier 33) that has been stored in the result storing section 31B of the storing section 31 (which is explained further below). For example, when the classification result of the scene classifier 33 is "landscape," the image data is enhanced so that blue and green colors are emphasized. It should be noted that the image enhancement section 34 may enhance the image data by reflecting not only classification results of the scene but also the contents of shooting data of the image file. For example, in the case where exposure compensation is minus, image data may be enhanced so as not to brighten an image with a dark atmosphere.

The printer control section 35 is realized with the CPU 22, the driving signal generation section 25, the control unit 24, and a printer control program stored in the memory 23. The printer control section 35 converts the enhanced image data into print data and lets the printing mechanism 10 print the image.

Scene Classification Processing

Figure 5:
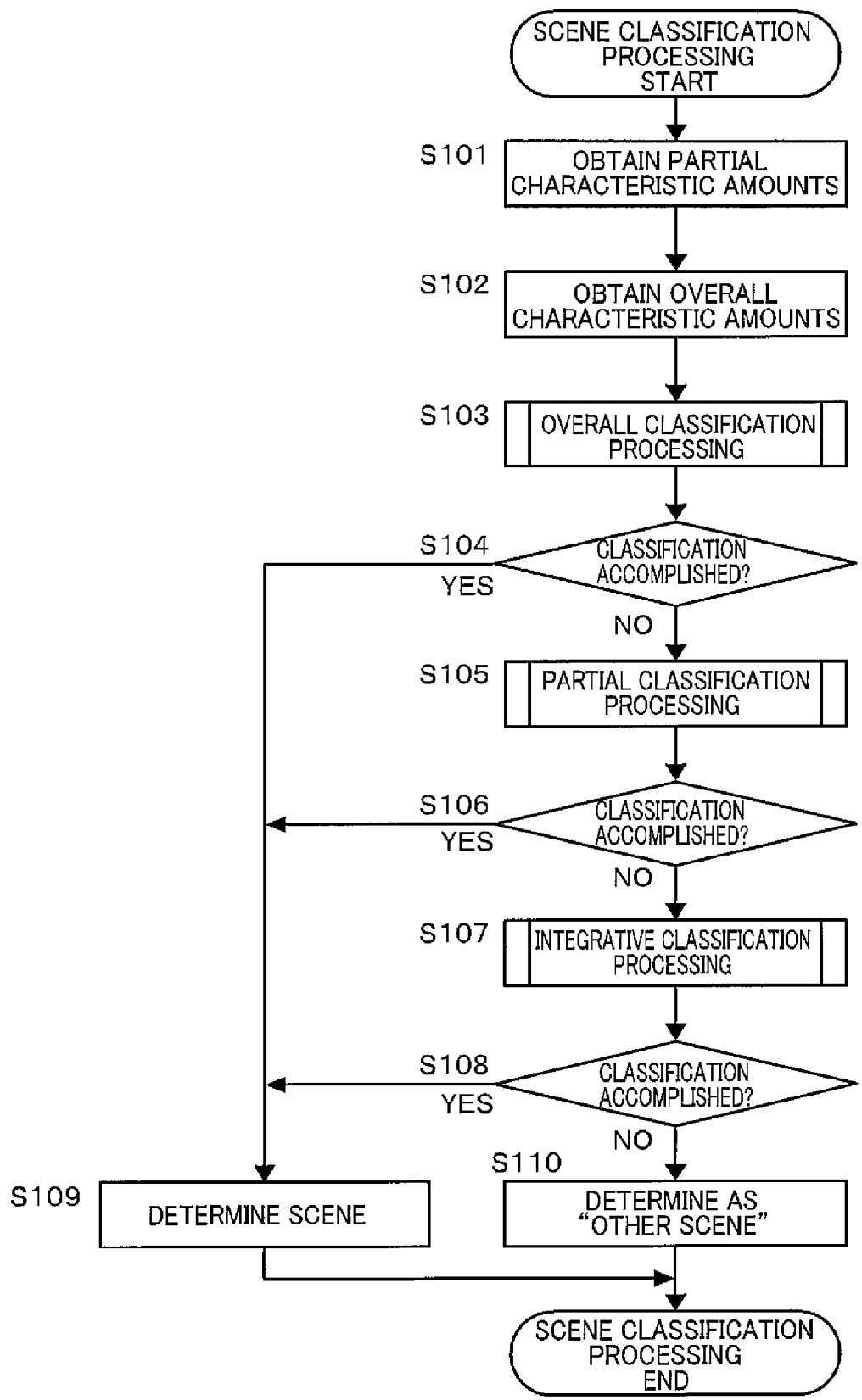
FIG. 5 is a flowchart of scene classification processing by a scene classification section.
Figure 6:
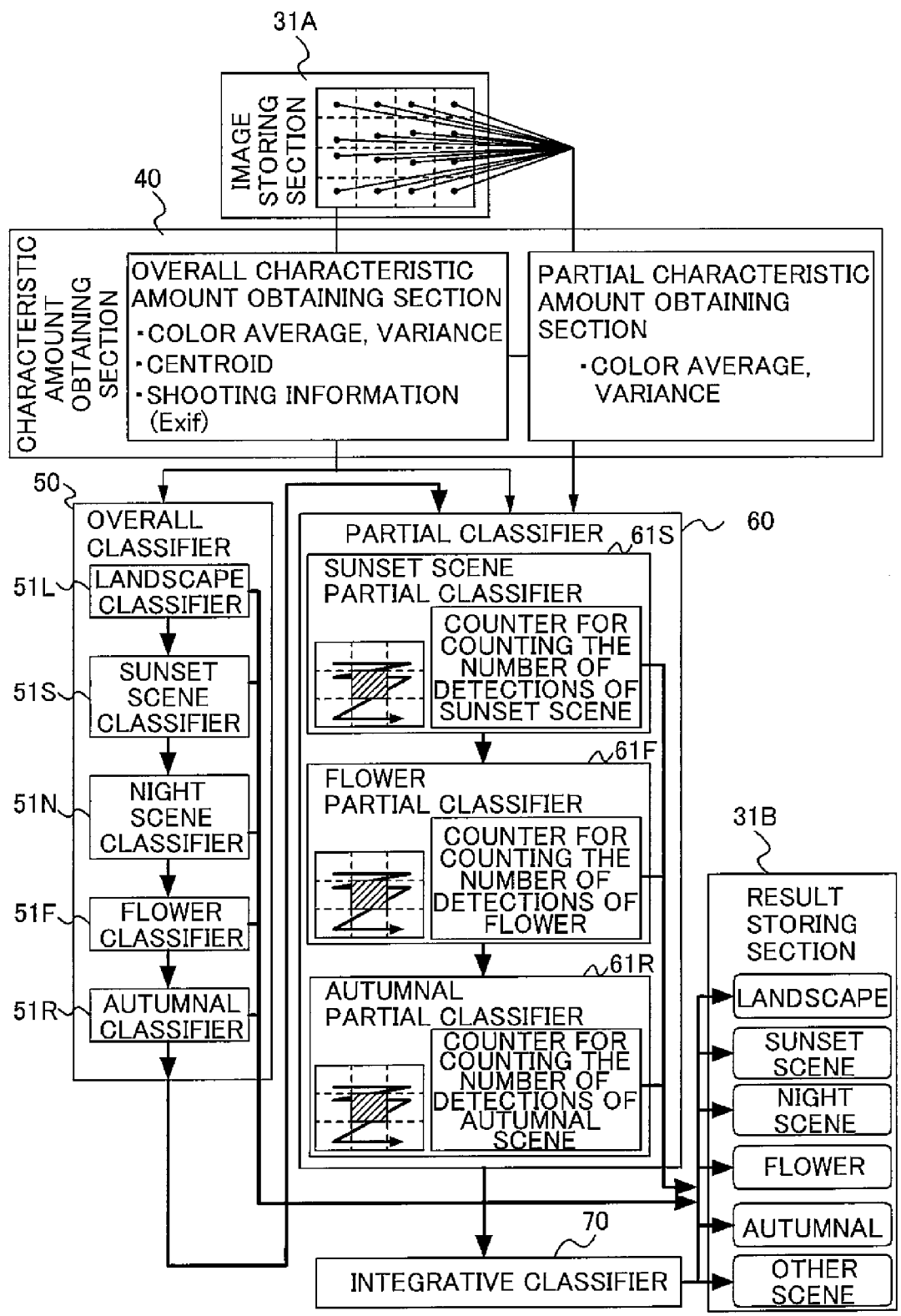
FIG. 6 is an explanatory diagram of functions of the scene classification section.

FIG. 5 is a flowchart of the scene classification processing performed by the scene classifier 33. FIG. 6 is an explanatory diagram of functions of the scene classifier 33. The components of the scene classifier 33 shown in the figure are realized with software and hardware. The scene classifier 33 includes a characteristic amount obtaining section 40, an overall classifier 50, a partial classifier 60 and an integrative classifier 70, as shown in FIG. 6.

First, a characteristic amount obtaining section 40 analyzes the image data decoded in the image storing section 31A of the storing section 31 and obtains partial characteristic amounts (S101). More specifically, the characteristic amount obtaining section 40 divides the image data into 8×8=64 blocks, calculates color average and variance of the each of the blocks, and obtains the calculated color averages and variances as partial characteristic amounts. It should be noted that every pixel here includes data about a tone value in the YCC color space, and an average value of Y, an average value of Cb, and an average value of Cr are calculated for each block, and also a variance of Y, a variance of Cb, and a variance of Cr are calculated for each block. That is to say, three color averages and three variances are calculated as partial characteristic amounts for each block. These color averages and variances indicate characteristics of the partial image in each block. It should be noted that it is also possible to calculate average values and variances in RGB color space.

Since the color averages and variances are calculated for each block, the characteristic amount obtaining section 40 decodes portions of the image data corresponding to the respective blocks in a block-by-block order without decoding all of the image data in the image storing section 31A. For this reason, the image storing section 31A does not have to be provided with a capacity as is needed for decoding the entire image file.

Next, the characteristic amount obtaining section 40 obtains overall characteristic amounts (S102). Specifically, the characteristic amount obtaining section 40 obtains color averages and variances, a centroid, and shooting information of the entire image data as overall characteristic amounts. It should be noted that these color averages and variances indicate characteristics of the entire image. The color averages and variances and the centroid of the entire image data are calculated using the partial characteristic amounts obtained before. For this reason, it is not necessary to decode the image data when calculating the overall characteristic amounts, and thus the speed at which the overall characteristic amounts are calculated is increased. It is because the calculation speed is increased in this manner that the overall characteristic amounts are obtained after the partial characteristic amounts, although overall classification processing (described later) is performed before partial classification processing (described later). It should be noted that the shooting information is extracted from the shooting data in the image file. More specifically, information such as the aperture value, the shutter speed, and whether or not the flash is fired, is used as the overall characteristic amounts. However, not all of the shooting data in the image file is used as the overall characteristic amounts.

Next, an overall classifier 50 performs the overall classification processing (S103). The overall classification processing is processing for classifying (estimating) the scene of the image represented by the image data based on the overall characteristic amounts. A detailed description of the overall classification processing is provided later.

If the scene can be classified by the overall classification processing ("YES" in S104), the scene classifier 33 determines the scene by storing the classification result in the result storing section 31B of the storing section 31 (S109) and terminates the scene classification processing. That is to say, if the scene can be classified by the overall classification processing ("YES" in S104), the partial classification processing and integrative classification processing are omitted. Thus, the speed of the scene classification processing is increased.

If the scene cannot be classified by the overall classification processing ("NO" in S104), a partial classifier 60 then performs the partial classification processing (S105). The partial classification processing is processing for classifying the scene of the entire image represented by the image data based on the partial characteristic amounts. A detailed description of the partial classification processing is provided later.

If the scene can be classified by the partial classification processing ("YES" in S106), the scene classifier 33 determines the scene by storing the classification result in the result storing section 31B of the storing section 31 (S109) and terminates the scene classification processing. That is to say, if the scene can be classified by the partial classification processing ("YES" in S106), the integrative classification processing is omitted. Thus, the speed of the scene classification processing is increased.

If the scene cannot be classified by the partial classification processing ("NO" in S106), an integrative classifier 70 performs the integrative classification processing (S107). A detailed description of the integrative classification processing is provided later.

If the scene can be classified by the integrative classification processing ("YES" in S108), the scene classifier 33 determines the scene by storing the classification result in the result storing section 31B of the storing section 31 (S109) and terminates the scene classification processing. On the other hand, if the scene cannot be classified by the integrative classification processing ("NO" in S108), a classification result that the image represented by the image data is an "other" scene (a scene other than "landscape," "sunset scene," "night scene," "flower," "autumnal," and "other,") is stored in the result storing section 31B (S110).

Overall Classification Processing

Figure 7:
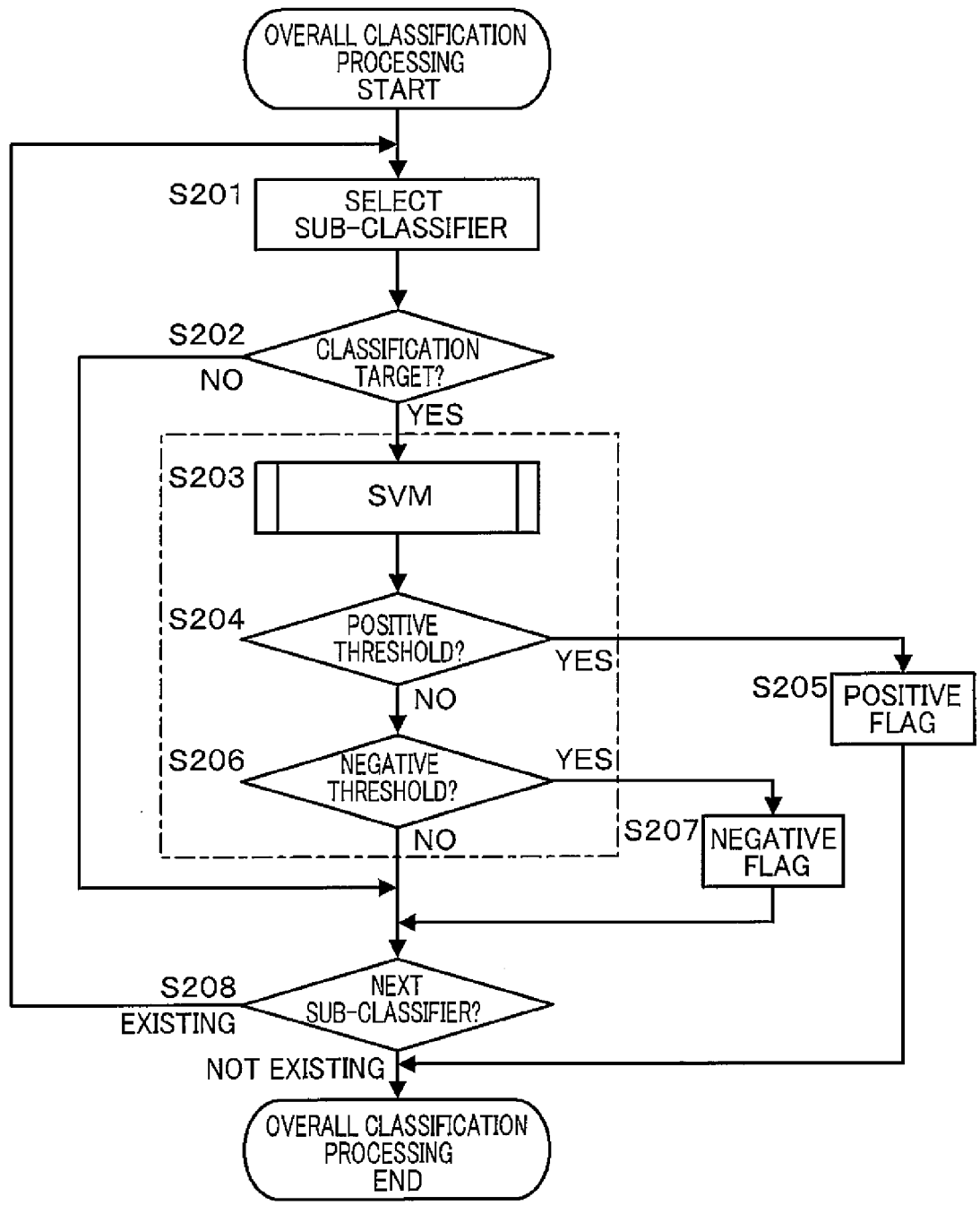
FIG. 7 is a flowchart of the overall classification processing.

FIG. 7 is a flowchart of overall classification processing. Here, the overall classification processing is described also with reference to FIG. 6.

First, the overall classifier 50 selects one sub-classifier 51 from a plurality of sub-classifiers 51 (S201). The overall classifier 50 is provided with five sub-classifiers 51 that classify whether or not the image serving as an object of classification (image to be classified) belongs to a specific scene. The five sub-classifiers 51 classify landscape scenes, sunset scenes, night scenes, flower scenes, and autumnal scenes, respectively. Here, the overall classifier 50 selects the sub-classifiers 51 in the order of landscape→sunset→night→flower→autumnal scene. For this reason, at the start, the sub-classifier 51 (landscape classifier 51L) that classifies whether or not the image to be classified belongs to landscape scenes is selected.

Next, the overall classifier 50 references a classification target table and determines whether or not to classify the scene using the selected sub-classifier 51 (S202).

Figures 8, 9:
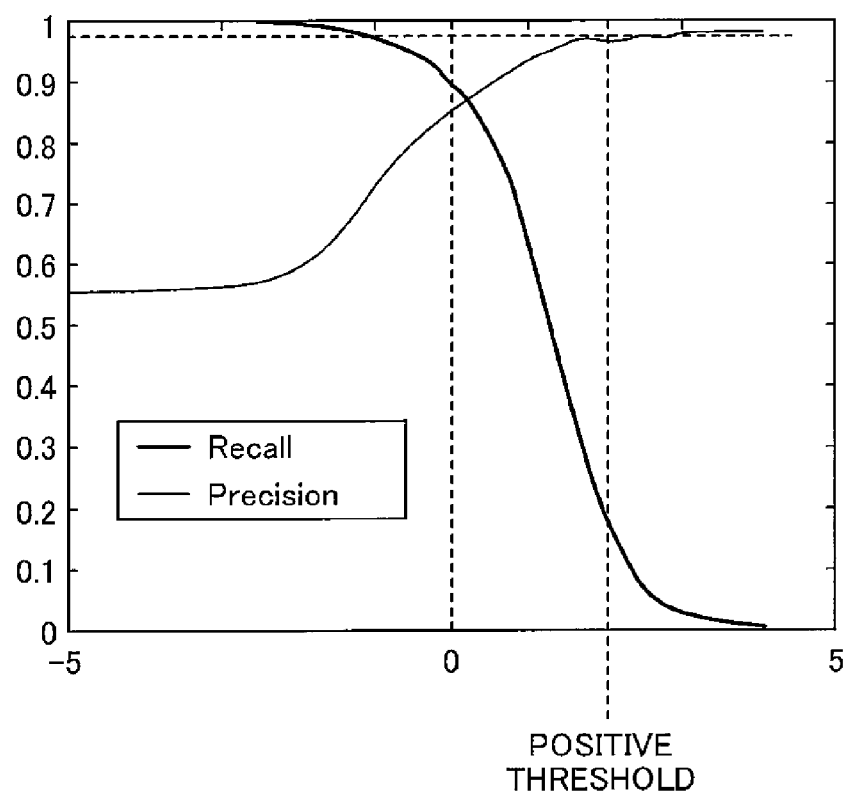
FIG. 8 is an explanatory diagram of a classification target table.
FIG. 9 is an explanatory diagram of a positive threshold in the overall classification processing.

FIG. 8 is an explanatory diagram of a classification target table. This classification target table is stored in the result storing section 31B of the storing section 31. At the first stage, all the fields in the classification target table are set to zero. In the process of S202, a "negative" field is referenced, and when this field is zero, the result is judged to be "YES," and when this field is 1, the result is judged to be "NO." Here, the overall classifier 50 references the "negative" field in the "landscape" column of the classification target table to find that this field is zero and thus the judgment result is "YES" (YES in S202).

Next, the sub-classifier 51 classifies whether or not the classification target image belongs to a specific scene. Specifically, the sub-classifier 51 calculates the probability (degree of certainty) that the image to be classified belongs to a specific scene based on the overall characteristic amounts (S203). The sub-classifiers 51 of the present embodiment employ a classification method using a support vector machine (SVM). A description of the support vector machine is provided later. If the image to be classified belongs to a specific scene, the discriminant calculated with the sub-classifier 51 is likely to have a positive value. If the image to be classified does not belong to a specific scene, the discriminant calculated with the sub-classifier 51 is likely to have a negative value. Moreover, the higher the degree of certainty that the image to be classified belongs to a specific scene is, the larger the value of the discriminant is. Accordingly, a large value of the discriminant indicates a high probability that the image to be classified belongs to a specific scene, and a small value of the discriminant indicates a low probability that the image to be classified belongs to a specific scene.

Next, the sub-classifier 51 determines whether or not the value of the discriminant is larger than a positive threshold (S204). If the value of the discriminant is larger than the positive threshold, the sub-classifier 51 judges that the image to be classified belongs to a specific scene.

Figures 10, 11:
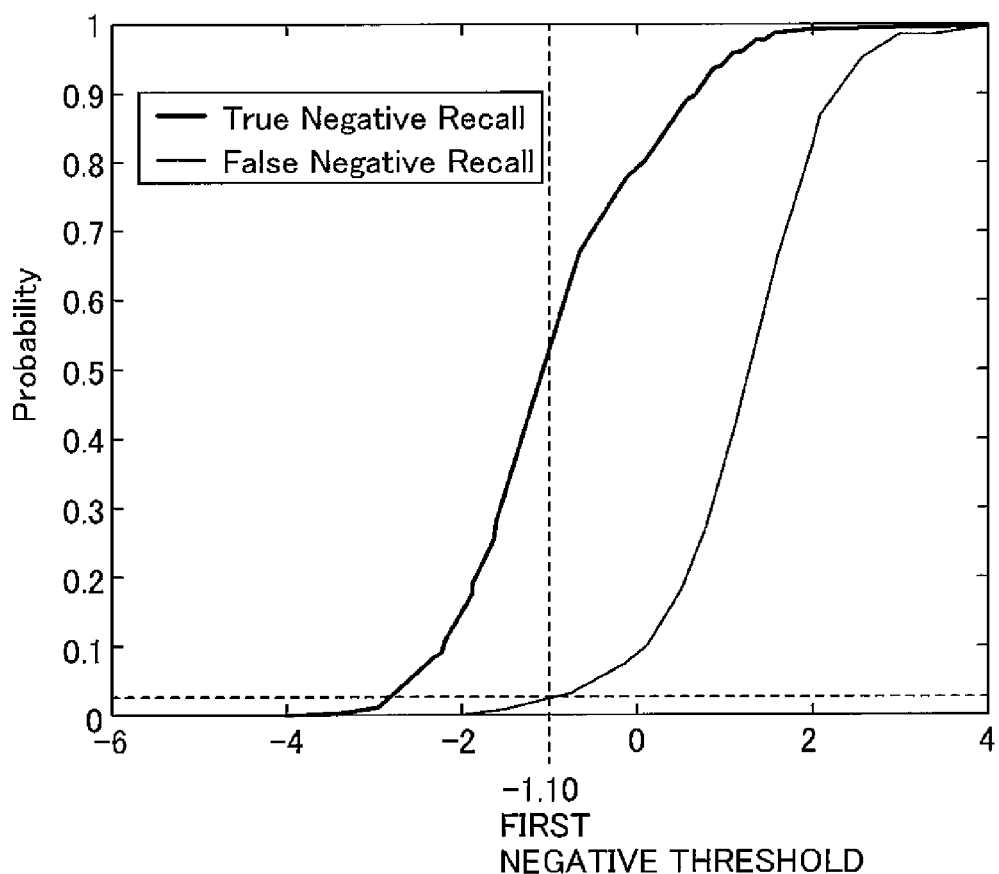
FIG. 10 is an explanatory diagram of Recall and Precision.
FIG. 11 is an explanatory diagram of a first negative threshold.

FIG. 9 is an explanatory diagram of the positive threshold in the overall classification processing. In this diagram, the horizontal axis represents the positive threshold, and the vertical axis represents the probabilities of Recall and Precision. FIG. 10 is an explanatory diagram of Recall and Precision. If the value of the discriminant is equal to or more than the positive threshold, the classification result is taken to be positive, and if the value of the discriminant is less than the positive threshold, the classification result is taken to be negative.

Recall indicates the recall ratio or detection rate. Recall is the proportion of images classified as belonging to a specific scene to the total number of images of that specific scene. In other words, Recall indicates the probability that, when the sub-classifier 51 is used to classify an image of a specific scene, the sub-classifier 51 makes a positive classification (the probability that the image of the specific scene is classified as belonging to that specific scene). For example, Recall indicates the probability that, when the landscape classifier 51L is used to classify a landscape image, the landscape classifier 51L classifies the image as belonging to landscape scenes.

Precision indicates the ratio of correct answers or accuracy rate. Precision is the proportion of the number of images of a specific scene to the total number of positively classified images. In other words, Precision indicates the probability that, when the sub-classifier 51 for classifying a specific scene positively determines an image, the image to be classified is the specific scene. For example, Precision indicates the probability that, when the landscape classifier 51L classifies an image as belonging to landscape scenes, the classified image is actually a landscape image.

As can be seen from FIG. 9, the larger the positive threshold is, the greater Precision is. Thus, the larger the positive threshold is, the higher the probability that an image classified as belonging to, for example, landscape scenes is a landscape image is. That is to say, the larger the positive threshold is, the lower the probability of misclassification is.

On the other hand, the larger the positive threshold is, the smaller the Recall is. As a result, for example, even when a landscape image is classified by the landscape classifier 51L, it is difficult to correctly classify the image as belonging to landscape scenes. If the image to be classified can be classified as belonging to landscape scenes ("YES" in S204), classification with respect to the other scenes (such as sunset scenes) is no longer performed, and thus the speed of the overall classification processing is increased. Therefore, the larger the positive threshold is, the lower the speed of the overall classification processing is. Moreover, since the speed of the scene classification processing is increased by omitting the partial classification processing when scene classification can be accomplished by the overall classification processing (S104), the larger the positive threshold is, the lower the speed of the scene classification processing is.

That is to say, too small a positive threshold will result in a high probability of misclassification, and too large a positive threshold will result in a decreased processing speed. In the present embodiment, the positive threshold for landscapes is set to 1.27 in order to set the ratio of correct answers (Precision) to 97.5%.

If the value of the discriminant is larger than the positive threshold ("YES" in S204), then the sub-classifier 51 determines that the image to be classified belongs to a specific scene, and sets a positive flag (S205). "Set a positive flag" refers to setting a "positive" field in FIG. 8 to 1. In this case, the overall classifier 50 terminates the overall classification processing without performing classification by the subsequent sub-classifiers 51. For example, if an image can be classified as a landscape image, the overall classifier 50 terminates the overall classification processing without performing classification with respect to sunset scenes and so on. In this case, the speed of the overall classification processing can be increased because classification by the subsequent sub-classifiers 51 is omitted.

If the value of the discriminant is not larger than the positive threshold ("NO" in S204), then the sub-classifier 51 cannot judge the image to be classified as belonging to a specific scene, and performs the subsequent process of S206.

Then, the sub-classifier 51 compares the value of the discriminant with a negative threshold (S206). Based on this comparison, the sub-classifier 51 may determine that the image to be classified does not belong to a predetermined scene. Such a determination is made in two ways. First, if the value of the discriminant of the sub-classifier 51 with respect to a certain specific scene is smaller than a first negative threshold, it is judged that the image to be classified does not belong to that specific scene. For example, if the value of the discriminant of the landscape classifier 51L is smaller than the first negative threshold, it is judged that the image to be classified does not belong to landscape scenes. Second, if the value of the discriminant of the sub-classifier 51 with respect to a certain specific scene is larger than a second negative threshold, then it is judged that the image to be determined does not belong to a scene different from that specific scene. For example, if the value of the discriminant of the landscape classifier 51L is larger than the second negative threshold, then it is determined that the image to be classified does not belong to night scenes.

FIG. 11 is an explanatory diagram of a first negative threshold. In this diagram, the horizontal axis represents the first negative threshold, and the vertical axis represents the probability. The bold curve in the graph represents True Negative Recall and indicates the probability that an image that is not a landscape image is correctly classified as not being a landscape image. The thin curve in the graph represents False Negative Recall and indicates the probability that a landscape image is misclassified as not being a landscape image.

As can be seen from FIG. 11, the smaller the first negative threshold is, the smaller False Negative Recall is. Thus, the smaller the first negative threshold is, the lower the probability that an image classified as not belonging to, for example, landscape scenes is actually a landscape image becomes. In other words, the probability of misclassification decreases.

On the other hand, the smaller the first negative threshold is, the smaller True Negative Recall is as well. As a result, an image that is not a landscape image is less likely to be classified as not being a landscape image. On the other hand, if the image to be classified can be classified as not being a specific scene, processing by a sub-partial classifier 61 with respect to that specific scene is omitted during the partial classification processing, thereby increasing the speed of the scene classification processing (described later, S302 in FIG. 14). Therefore, the smaller the first negative threshold is, the lower the speed of the scene classification processing is.

That is to say, too large a first negative threshold will result in a high probability of misclassification, and too small a first negative threshold will result in a decreased processing speed. In the present embodiment, the first negative threshold is set to −1.10 in order to set False Negative Recall to 2.5%.

When the probability that a certain image belongs to landscape scenes is high, the probability that this image belongs to night scenes is inevitably low. Thus, when the value of the discriminant of the landscape classifier 51L is large, it may be possible to classify the image as not being a night scene. The second negative threshold is provided in order to perform such classification.

Figure 12:
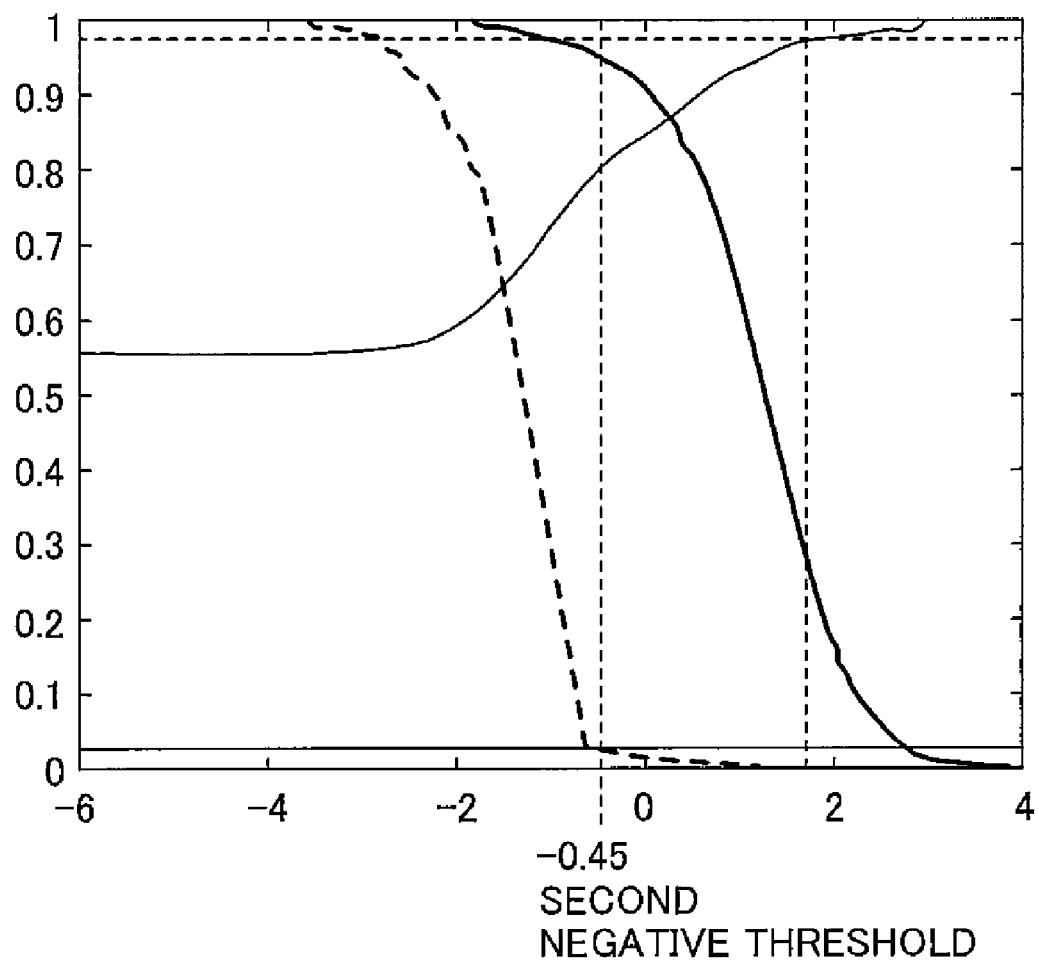
FIG. 12 is an explanatory diagram of a second negative threshold.

FIG. 12 is an explanatory diagram of a second negative threshold. In this diagram, the horizontal axis represents the value of the discriminant with respect to landscapes, and the vertical axis represents the probability. This diagram shows, in addition to the graphs of Recall and Precision shown in FIG. 9, a graph of Recall with respect to night scenes, which is drawn by a dotted line. When looking at this graph drawn by the dotted line, it is found that when the value of the discriminant with respect to landscapes is larger than −0.45, the probability that the image to be classified is a night scene image is 2.5%. In other words, even if the image to be classified is classified as not being a night scene image when the value of the discriminant with respect to landscapes is larger than −0.45, the probability of misclassification is no more than 2.5%. In the present embodiment, the second negative threshold is therefore set to −0.45.

If the value of the discriminant is smaller than the first negative threshold or if the value of the discriminant is larger than the second negative threshold ("YES" in S206), the sub-classifier 51 judges that the image to be classified does not belong to a predetermined scene, and sets a negative flag (S207). "Set a negative flag" refers to setting a "negative" field in FIG. 8 to 1. For example, if it is judged that the image to be classified does not belong to landscape scenes based on the first negative threshold, the "negative" field in the "landscape" column is set to 1. Moreover, if it is judged that the image to be classified does not belong to night scenes based on the second negative threshold, the "negative" field in the "night scene" column is set to 1.

FIG. 13A is an explanatory diagram of a threshold table. This threshold table may be stored in a storing section 31 or may be incorporated in a part of a program that causes to execute an overall classification processing. The threshold table is stored with data relating to the above described positive threshold and negative threshold.

FIG. 13B is an explanatory diagram of the thresholds in the landscape classifier 51L described above. In the landscape classifier 51L, a positive threshold and negative thresholds are set in advance. The positive threshold is set to 1.27. The negative thresholds include a first negative threshold and second negative thresholds. The first negative threshold is set to −1.10. The second negative thresholds are set for scenes other than landscapes to respective values.

FIG. 13C is an explanatory diagram of an outline of the processing by the landscape classifier 51L described above. Here, for the sake of simplicity of description, the second negative thresholds are described with respect to night scenes alone. If the value of the discriminant is larger than 1.27 ("YES" in S204), the landscape classifier 51L judges that the image to be classified belongs to landscape scenes. If the value of the discriminant is not larger than 1.27 ("NO" in S204) but larger than −0.45 ("YES" in S206), the landscape classifier 51L judges that the image to be classified does not belong to night scenes. If the value of the discriminant is smaller than −1.10 ("YES" in S206), the landscape classifier 51L judges that the image to be classified does not belong to landscape scenes. It should be noted that the landscape classifier 51L also judges with respect to sunset scenes, flower, and autumnal whether the image to be classified does not belong to these scenes based on the second negative thresholds. However, since the second negative threshold with respect to these scenes is larger than the positive threshold, the landscape classifier 51L will never judge that the image to be classified does not belong to these scenes.

If "NO" is established in S202, and "NO" is established in S206, or if the process of S207 is finished, the overall classifier 50 determines whether or not there is a subsequent sub-classifier 51 (S208). Here, the processing by the landscape classifier 51L has been finished, so that the overall classifier 50 determines in S208 that there is a subsequent sub-classifier 51 (sunset scene classifier 51S).

Then, if the process of S205 is finished (if it is judged that the image to be classified belongs to a specific scene) or if it is judged in S208 that there is no subsequent sub-classifier 51 (if it cannot be judged that the image to be classified belongs to a specific scene), the overall classifier 50 terminates the overall classification processing.

As already described above, when the overall classification processing is terminated, the scene classifier 33 determines whether or not scene classification could be accomplished by the overall classification processing (S104 in FIG. 5). At this time, the scene classifier 33 references the classification target table shown in FIG. 8 and judges whether or not there is a "1" among the "positive" fields.

If scene classification could be accomplished by the overall classification processing ("YES" in S104), the partial classification processing and the integrative classification processing are omitted. Thus, the speed of the scene classification processing is increased.

By the way, although not mentioned in the above description, in the case where a value of a discriminant has been calculated with the sub classifier 51, the overall classifier 50 may store Precision corresponding to the value of the discriminant as information relating to the degree of certainty in the result storing section 31B. Of course, the value of the discriminant itself may be stored as information relating to the degree of certainty.

Partial Classification Processing

Figure 14:
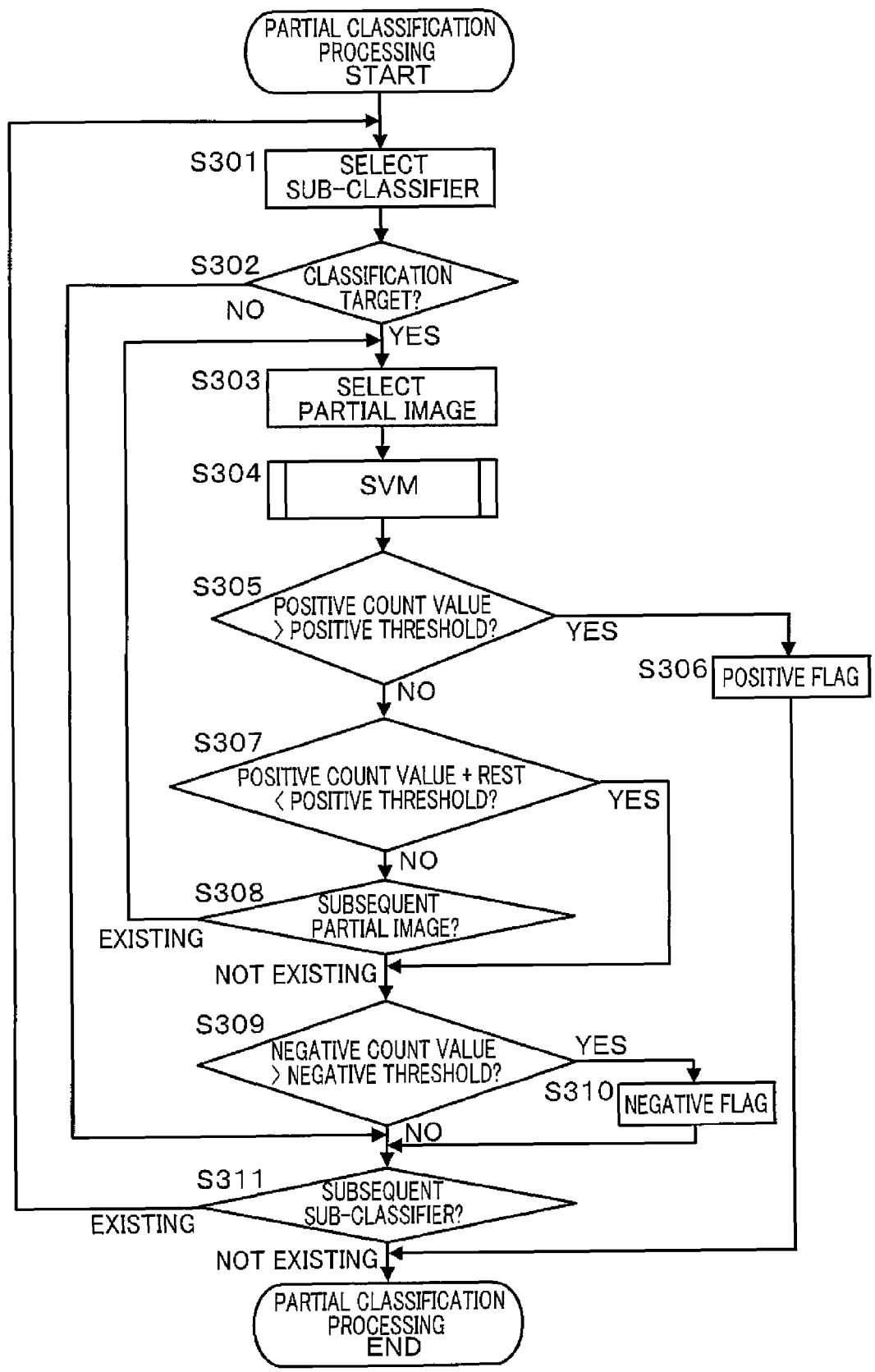
FIG. 14 is a flowchart of a partial classification process.

FIG. 14 is a flowchart of partial classification processing. The partial classification processing is performed if a scene cannot be classified by the overall classification processing ("NO" in S104 in FIG. 5). As described in the following, the partial classification processing is processing for classifying the scene of the entire image by individually classifying the scenes of partial images into which the image to be classified is divided. Here, the partial classification processing is described also with reference to FIG. 6.

First, the partial classifier 60 selects one sub-partial classifier 61 from a plurality of sub-partial classifiers 61 (S301). The partial classifier 60 is provided with three sub-partial classifiers 61. Each of the sub-partial classifiers 61 classifies whether or not the 8×8=64 blocks of partial images into which the image to be classified is divided belong to a specific scene. The three sub-partial classifiers 61 here classify sunset scenes, flower scenes, and autumnal scenes, respectively. The partial classifier 60 selects the sub-partial classifiers 61 in the order of sunset→flower→autumnal scene (note that, the selection order of the sub-partial classifiers 61 is described later). Thus, at the start, the sub-partial classifier 61 (sunset scene partial classifier 61S) that classifies whether or not the partial images belong to a sunset scene is selected.

Next, the partial classifier 60 references the classification target table (FIG. 8) and determines whether or not scene classification is to be performed using the selected sub-partial classifier 61 (S302) Here, the partial classifier 60 references the "negative" field in the "sunset scene" column in the classification target table, and judges "YES" when there is a zero, and "NO" when there is a 1. It should be noted that if, during the overall classification processing, the sunset scene classifier 51S has set a negative flag based on the first negative threshold or another sub-classifier 51 has set a negative flag based on the second negative threshold, the judgment is "NO" in this step S302. If the judgment is "NO", the partial classification processing with respect to sunset scenes is omitted, so that the speed of the partial classification processing is increased. However, for the sake of explanation, it is assumed that the judgment here is "YES."

Next, the sub-partial classifier 61 selects one partial image from the 8×8=64 blocks of partial images into which the image to be classified is divided (S303).

Figures 15, 16:
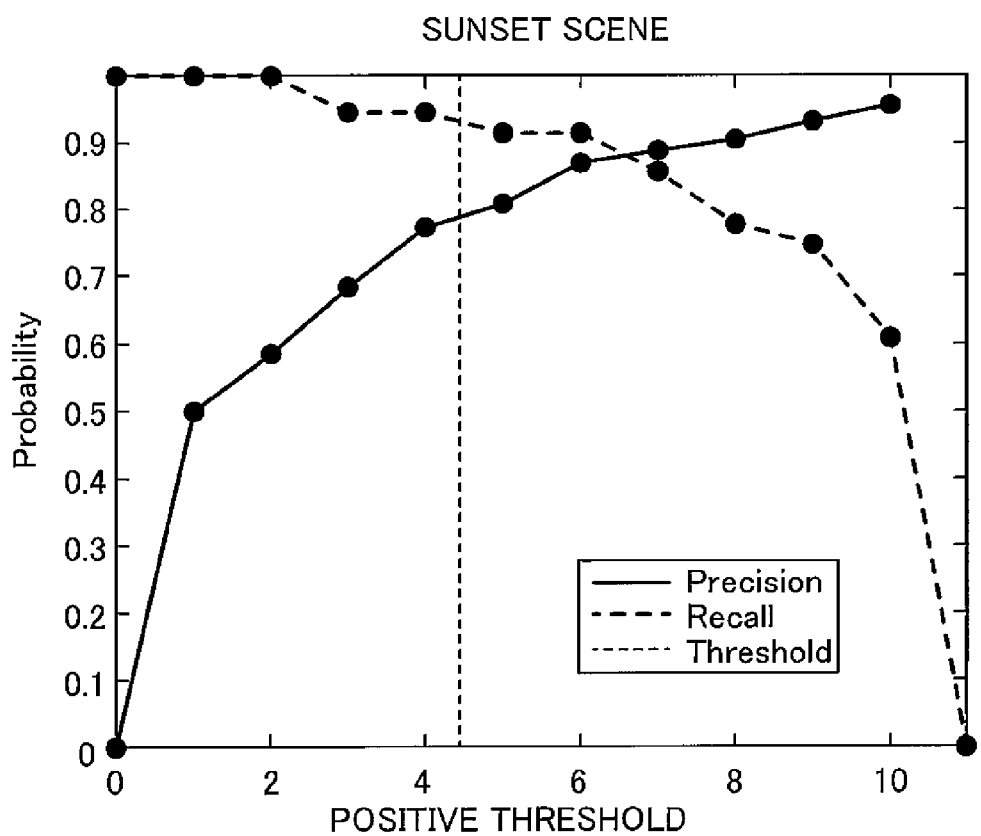
FIG. 15 is an explanatory diagram of an order in which partial images are selected by a sunset scene partial classifier.
FIG. 16 shows graphs of Recall and Precision in case that a sunset scene image is classified using only the top-ten partial images.

FIG. 15 is an explanatory diagram of the order in which the partial images are selected by the sunset scene partial classifier 61S. If the scene of the entire image is specified based on partial images, it is preferable that the partial images used for classification are portions in which the photographic subject is present. For this reason, in the present embodiment, several thousand sample sunset scene images were prepared, each of the sunset scene images was divided into 8×8=64 blocks, blocks containing a partial sunset scene image (partial image of the sun and sky of a sunset scene) were extracted, and based on the location of the extracted blocks, the probability that a partial sunset scene image is present in each block was calculated. In the present embodiment, partial images are selected in descending order of the presence probability of the blocks. It should be noted that information about the selection sequence shown in the diagram is stored in the memory 23 as a part of the program.

In the case of a sunset scene image, the sky of the sunset scene often extends from around the center portion to the upper half portion of the image, so that the presence probability increases in blocks located in a region from around the center portion to the upper half portion. In addition, in the case of a sunset scene image, the lower ⅓ portion of the image often becomes dark due to backlight and it is usually impossible to determine based on a single partial image whether the image is a sunset scene or a night scene, so that the presence probability decreases in blocks located in the lower ⅓ portion. In the case of a flower image, the flower is usually positioned in the center portion of the image, so that the probability that a flower portion image is present around the center portion is high.

Next, the sub-partial classifier 61 evaluates, based on the partial characteristic amounts of the partial image that has been selected, whether or not the selected partial image belongs to a specific scene (S304). The sub-partial classifiers 61 employ a discrimination method using a support vector machine (SVM), as is the case with the sub-classifiers 51 of the overall classifier 50. A description of the support vector machine is provided later. If the discriminant has a positive value, it is judged that the partial image belongs to the specific scene, and the sub-partial classifier 61 increments a positive count value. If the discriminant has a negative value, it is judged that the partial image does not belong to the specific scene, and the sub-partial classifier 61 increments a negative count value.

Next, the sub-partial classifier 61 judges whether or not the positive count value is larger than a positive threshold (S305). The positive count value indicates the number of partial images that have been judged to belong to the specific scene. If the positive count value is larger than the positive threshold ("YES" in S305), the sub-partial classifier 61 judges that the image to be classified belongs to the specific scene, and sets a positive flag (S306). In this case, the partial classifier 60 terminates the partial classification processing without performing classification by the subsequent sub-partial classifiers 61. In this case, the speed of the partial classification processing can be increased because classification by the subsequent sub-partial classifiers 61 is omitted.

If the positive count value is not larger than the positive threshold ("NO" in S305), the sub-partial classifier 61 cannot determine that the image to be classified belongs to the specific scene, and performs the processing of the subsequent step S307.

If the sum of the positive count value and the number of remaining partial images is smaller than the positive threshold ("YES" in S307), the sub-partial classifier 61 proceeds to the process of S309. If the sum of the positive count value and the number of remaining partial images is smaller than the positive threshold, it is impossible for the positive count value to become larger than the positive threshold even if the positive count value is incremented by all of the remaining partial images, so that classification with the support vector machine for the remaining partial images is omitted by advancing the process to S309. As a result, the speed of the classification processing can be increased.

If the sub-partial classifier 61 judges "NO" in S307, the sub-partial classifier 61 judges whether or not there is a subsequent partial image (S308). In the present embodiment, not all of the 64 partial images into which the image to be classified is divided are selected sequentially. Only the top-ten partial images outlined by bold lines in FIG. 15 are selected sequentially. For this reason, when classification of the tenth partial image is finished, the sub-partial classifier 61 judges in S308 that there is no subsequent partial image. ("The number of partial images remaining" in S307 is also determined with consideration to this aspect.)

FIG. 16 shows graphs of Recall and Precision when a sunset scene image is classified using only the top-ten partial images of the 64 partial images into which the image to be classified is divided. When the positive threshold is set as shown in this diagram, the ratio of correct answers (Precision) can be set to about 80% and the recall ratio (Recall) can be set to about 90%, so that classification can be performed with high precision.

In the present embodiment, classification of the sunset scene image is performed based on only ten partial images. Accordingly, in the present embodiment, the speed of the partial classification processing can be made higher than in the case of performing classification of the sunset scene image using all of the 64 partial images.

Moreover, in the present embodiment, classification of the sunset scene image is performed using the top-ten partial images with a high presence probability of containing a partial sunset scene image. Accordingly, in the present embodiment, both Recall and Precision can be set to higher levels than in the case of performing classification of the sunset scene image using ten partial images that have been extracted regardless of the presence probability.

Furthermore, in the present embodiment, the partial images are selected in descending order of the presence probability of containing a partial sunset scene image. As a result, there is a greater likelihood of judging "YES" at an early stage in S305. Accordingly, the speed of the partial classification processing can be higher than in the case of selecting partial images in the order regardless of whether the presence probability is high or low.

If the judgment is "YES" in S307 or if it is judged in S308 that there is no subsequent partial image, then the sub-partial classifier 61 judges whether or not the negative count value is larger than a negative threshold (S309). This negative threshold has substantially the same function as the negative threshold (S206 in FIG. 7) in the above-described overall classification processing, and thus a detailed description thereof is omitted. If the judgment is "YES" in S309, a negative flag is set as in the case of S207 in FIG. 7.

If the judgment is "NO" in S302, if it is "NO" in S309, or if the process of S310 is finished, the partial classifier 60 judges whether or not there is a subsequent sub-partial classifier 61 (S311). If the processing by the sunset scene partial classifier 61S has been finished, there are remaining sub-partial classifiers 61, i.e., the flower partial classifier 61F and the autumnal partial classifier 61R, so that the partial classifier 60 judges in S311 that there is a subsequent sub-partial classifier 61.

Then, if the process of S306 is finished (if it is judged that the image to be classified belongs to a specific scene) or if it is judged in S311 that there is no subsequent sub-partial classifier 61 (if it cannot be judged that the image to be classified belongs to a specific scene), the partial classifier 60 terminates the partial classification processing.

As already described above, when the partial classification processing is terminated, the scene classifier 33 judges whether or not scene classification could be accomplished by the partial classification processing (S106 in FIG. 5). At this time, the scene classifier 33 references the classification target table shown in FIG. 8 and judges whether or not there is a "1" among the "positive" fields.

If the scene could be classified by partial classification processing ("YES" in S106), then the integrative classification processing is omitted. Thus, the speed of the scene classification processing is increased.

By the way, in the above explanation, the sunset partial classifier 61S performs classification of a sunset image using 10 partial images, but the number of partial images to be used for classification is not limited to 10. Further, another sub-partial classifier 61 may classify the image using partial images of a number different from that of the sunset partial classifier 61S. In this embodiment, the flower partial classifier 61F classifies a flower image using 20 partial images, and the autumnal partial classifier 61R classifies an autumnal image using 15 partial images.

Support Vector Machine

Before describing the integrative classification processing, the support vector machine (SVM) used by the sub-classifiers 51 in the overall classification processing and the sub-partial classifiers 61 in the partial classification processing is described.

Figure 17A:
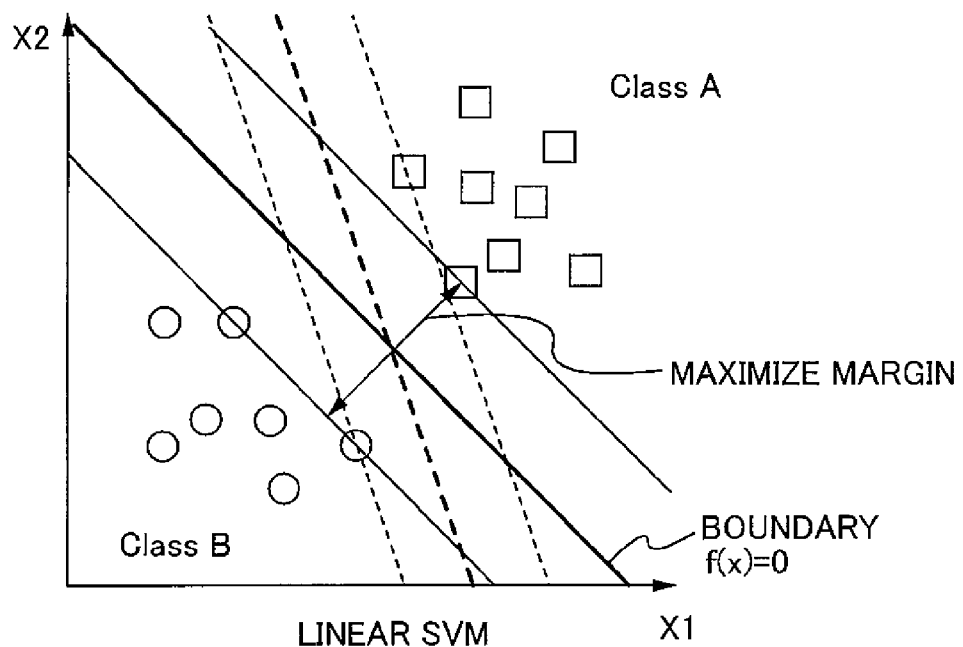
FIG. 17A is an explanatory diagram of discrimination using a linear support vector machine.

FIG. 17A is an explanatory diagram of discrimination using a linear support vector machine. Here, learning samples are shown in a two-dimensional space defined by two characteristic amounts x1 and x2. The learning samples are divided into two classes A and B. In the diagram, the samples belonging to the class A are represented by circles, and the samples belonging to the class B are represented by squares.

As a result of learning using the learning samples, a boundary that divides the two-dimensional space into two portions is defined. The boundary is defined as <w·x>+b=0 (where x=(x1, x2), w represents a weight vector, and <w·x> represents the inner product of w and x). However, the boundary is defined as a result of learning using the learning samples so as to maximize the margin. That is to say, in this diagram, the boundary is not the bold dotted line but the bold solid line.

Discrimination is performed using f(x)=<w·x>+b. If a given input x (separate from the learning samples) satisfies f(x)>0, it is discriminated as belonging to the class A, and if f(x)<0, it is discriminated as belonging to the class B.

Here, discrimination using the two-dimensional space is described, however there is no limitation to this (i.e., more than two characteristic amounts may be used). In this case, the boundary is defined as a hyperplane.

There are cases where separation between the two classes cannot be achieved by using a linear function. In such cases, when discrimination is performed with a linear support vector machine, the precision of the discrimination result decreases. To address this problem, the characteristic amounts in the input space are nonlinearly transformed, or in other words, nonlinearly mapped from the input space into a certain characteristics space, and thus separation in the characteristics space can be achieved by using a linear function. Nonlinear support vector machines use this method.

Figure 17B:
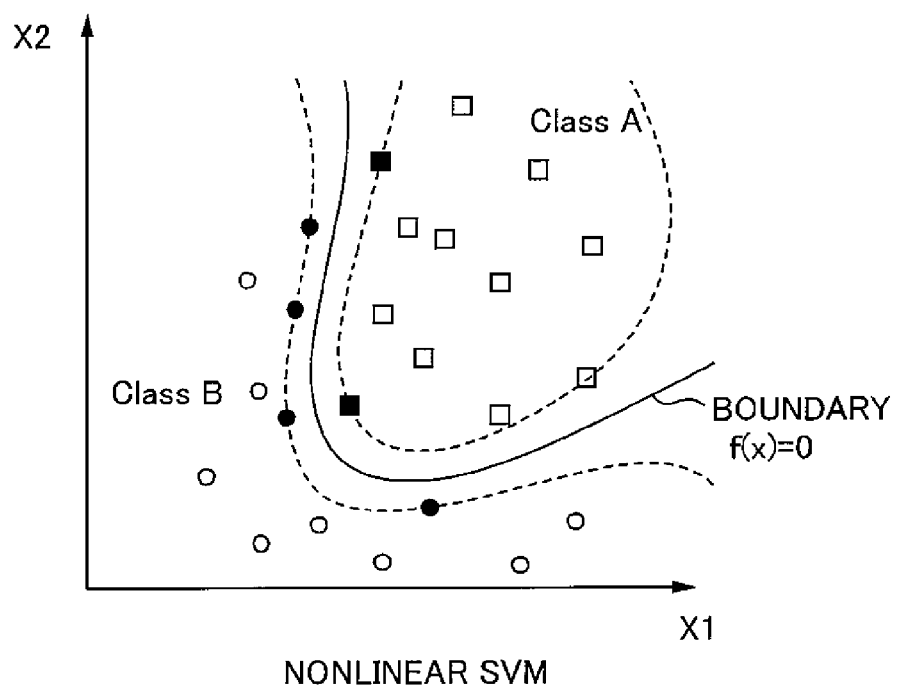
FIG. 17B is an explanatory diagram of discrimination using a kernel function.

FIG. 17B is an explanatory diagram of discrimination using a kernel function. Here, learning samples are shown in a two-dimensional space defined by two characteristic amounts x1 and x2. If a characteristics space as shown in FIG. 17A is obtained by nonlinear mapping from the input space shown in FIG. 17B, then separation between the two classes can be achieved by using a linear function. An inverse mapping of the boundary in the characteristics space is the boundary shown in FIG. 17B, where the boundary is defined so as to maximize the margin in this characteristics space. As a result, the boundary is nonlinear as shown in FIG. 17B.

The present embodiment uses a Gauss kernel function, so that the discriminant f(x) is as follows in (1) (where M represents the number of characteristic amounts, N represents the number of support vectors that contribute to the classification boundary of learning samples, $w_i$ represents a weight factor, $y_{ij}$ represents the characteristic amount of the support vectors, and $x_i$ represents the characteristic amount of an input x.)

$$f(x) \sum_i^N w_i \exp\left(-\sum_j^M \frac{(x_j - y_{ij})^2}{2\sigma^2}\right) \quad \text{Equation 1}$$

If a given input x (separate from the learning samples) satisfies f(x)>0, it is discriminated as belonging to the class A, and if f(x)<0, it is discriminated as belonging to the class B.

Moreover, the larger the value of f (x) is, the higher the probability that the input x belongs to the class A is. Conversely, the smaller the value of the discriminant f(x) is, the lower the probability that the input x belongs to the class A is. The sub-classifiers 51 in the overall classification processing and the sub-partial classifiers 61 in the partial classification processing, which are described above, utilize the value of the discriminant f(x) of the above-described support vector machine. In the calculation of the value of the discriminant f(x) with the support vector machine, the larger the number of learning samples (in this embodiment, several hundred thousands), that is the larger the number of the support vector, the longer it takes.

Further, k(x) shown in following Equation (2) of Equation (1) is a function according to a relationship between a classification target and each support vector. Hereinbelow, k(x) is also referred to as a kernel.

$$k(x) = \exp\left(-\sum_j^M \frac{(x_j - y_{ij})^2}{2\sigma^2}\right) \quad \text{Equation 2}$$

It should be noted that evaluation samples are prepared separately from the learning samples. The above-described graphs of Recall and Precision are based on the classification result with respect to the evaluation samples (a value of the discriminant f(x)).

Integrative Classification Processing

In the above-described overall classification processing and partial classification processing, the positive thresholds in the sub-classifiers 51 and the sub-partial classifiers 61 are set to relatively high values to set Precision (ratio of correct answers) to a rather high level. The reason for this is that when, for example, the ratio of correct answers of the landscape classifier 51L of the overall classifier 51 is set to a low level, a problem occurs in that the landscape classifier 51 may misclassify an autumnal image as a landscape image and terminate the overall classification processing before classification by the autumnal classifier 51R is performed. In the present embodiment, Precision (the ratio of correct answers) is set to a rather high level, and thus an image belonging to a specific scene is classified by the sub-classifier 51 (or the sub-partial classifier 61) with respect to that specific scene (for example, an autumnal image is classified by the autumnal classifier 51R (or the autumnal partial classifier 61R)).

However, when Precision (the ratio of correct answers) of the overall classification processing and the partial classification processing is set to a rather high level, the possibility that scene classification cannot be accomplished by the overall classification processing and the partial classification processing increases. To address this problem, in the present embodiment, when scene classification could not be accomplished by the overall classification processing and the partial classification processing, the integrative classification processing described in the following is performed.

Figure 18:
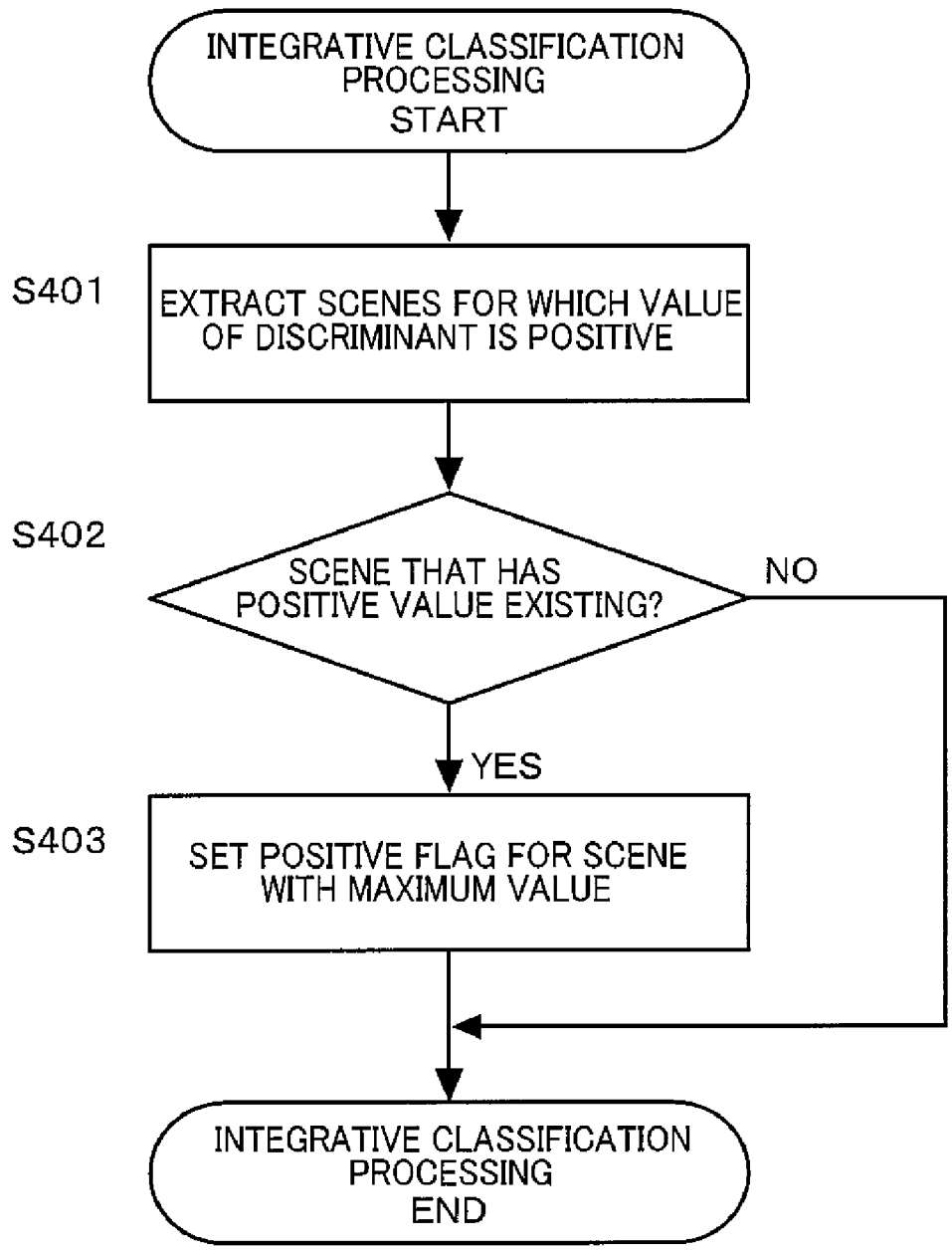
FIG. 18 is a flowchart of integrative classification processing.

FIG. 18 is a flowchart of integrative classification processing. As described in the following, the integrative classification processing selects a scene with the highest degree of certainty based on the value of the discriminant of the sub-classifiers 51 in the overall classification processing.

First, the integrative classifier 70 extracts, based on the values of the discriminants of the five sub-classifiers 51, a scene for which the value of the discriminant is positive (S401). At this time, the value of the discriminant calculated by the sub-classifiers 51 during the overall classification processing is used.

Next, the integrative classifier 70 judges whether or not there is a scene for which the value of the discriminant equation is positive (S402). In the case where there is a scene for which the value of the discriminant is positive ("YES" in S402), then a positive flag is set in the column of the scene with the maximum value (S403), and the integrative classification processing is terminated. Thus it is judged that the classification target image belongs to the scene with the maximum value.

On the other hand, when there is no scene for which the value of the discriminant is positive ("NO" in S402), the integrative classification processing is terminated without setting a positive flag. Thus, there is still no scene for which 1 is set in the "positive" fields of the classification target table shown in FIG. 8. That is to say, the scene to which the image to be classified belongs could not be classified.

As already described above, when the integrative classification processing is terminated, the scene classifier 33 judges whether or not scene classification could be accomplished by the integrative classification processing (S108 in FIG. 5). At this time, the scene classifier 33 references the classification target table shown in FIG. 8 and judges whether or not there is a "1" among the "positive" fields. If the judgment is "NO" in S402, then also the judgment in S108 is "NO".

First Embodiment

Summary

As described above, classification processing of scenes using support vector machines is carried out by the sub-classifiers 51 in the overall classification processing and the sub-partial classifiers 61 in the partial classification processing. Each of the sub-classifiers calculates a discriminant according to a support vector machine and compares a value of the discriminant and a threshold (positive threshold, negative threshold), thereby classifying whether or not the image to be classified pertains to a specific scene.

As evident from equation (1), the support vector machine calculates a function value corresponding to a relationship between the classification target and the support vector, then calculates the discriminant by progressively adding the function value. That is, the time for executing computation for the discriminant is proportional to the number of support vectors. It should be noted that support vectors refers to learning samples that contribute to classification boundaries. In the description below, support vectors are also referred to simply as samples, and the number of support vectors is also referred to as number of samples.

In this regard, to improve the classification accuracy with support vector machines, it is necessary to prepare a large amount of learning samples, and this also involves increasing the number of samples. Accordingly, time is used in calculating the discriminants using support vector machines and it has been difficult to increase the speed of classification processing. In particular, in a case where classification is carried out in order for each scene using a plurality of sub-classifiers as in the overall classification processing and the partial classification processing in the scene classification section 33, advancing to a later stage of classification processing becomes slower when time is used in classification processing by each of the sub-classifiers, which reduces the speed of classification processing overall.

Consequently, the present embodiment aims to improve the speed of classification processing by discontinuing calculations in a case where a classification result can be determined midway while calculating the discriminant of a support vector machine. For the first embodiment, description is given regarding a case where it is determined midway while calculating the discriminant that the image to be classified does not pertain to the specific scene. It should be noted that in the following embodiment, description regarding classification using a second negative threshold is omitted for convenience.

Regarding Classification Processing

Figure 20:
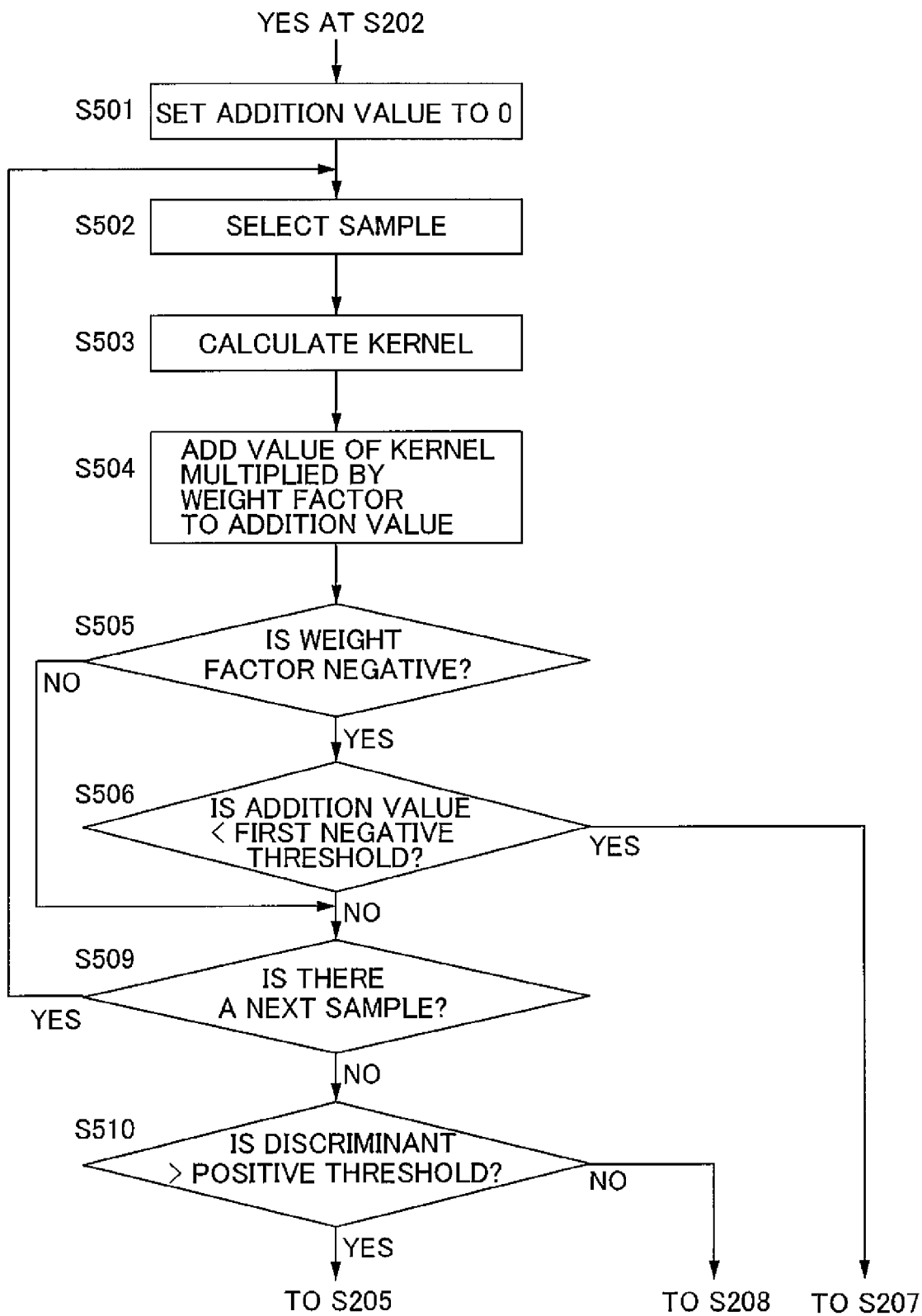
FIG. 20 is a flowchart for describing classification processing involved in a first embodiment of the invention.
Figure 21:
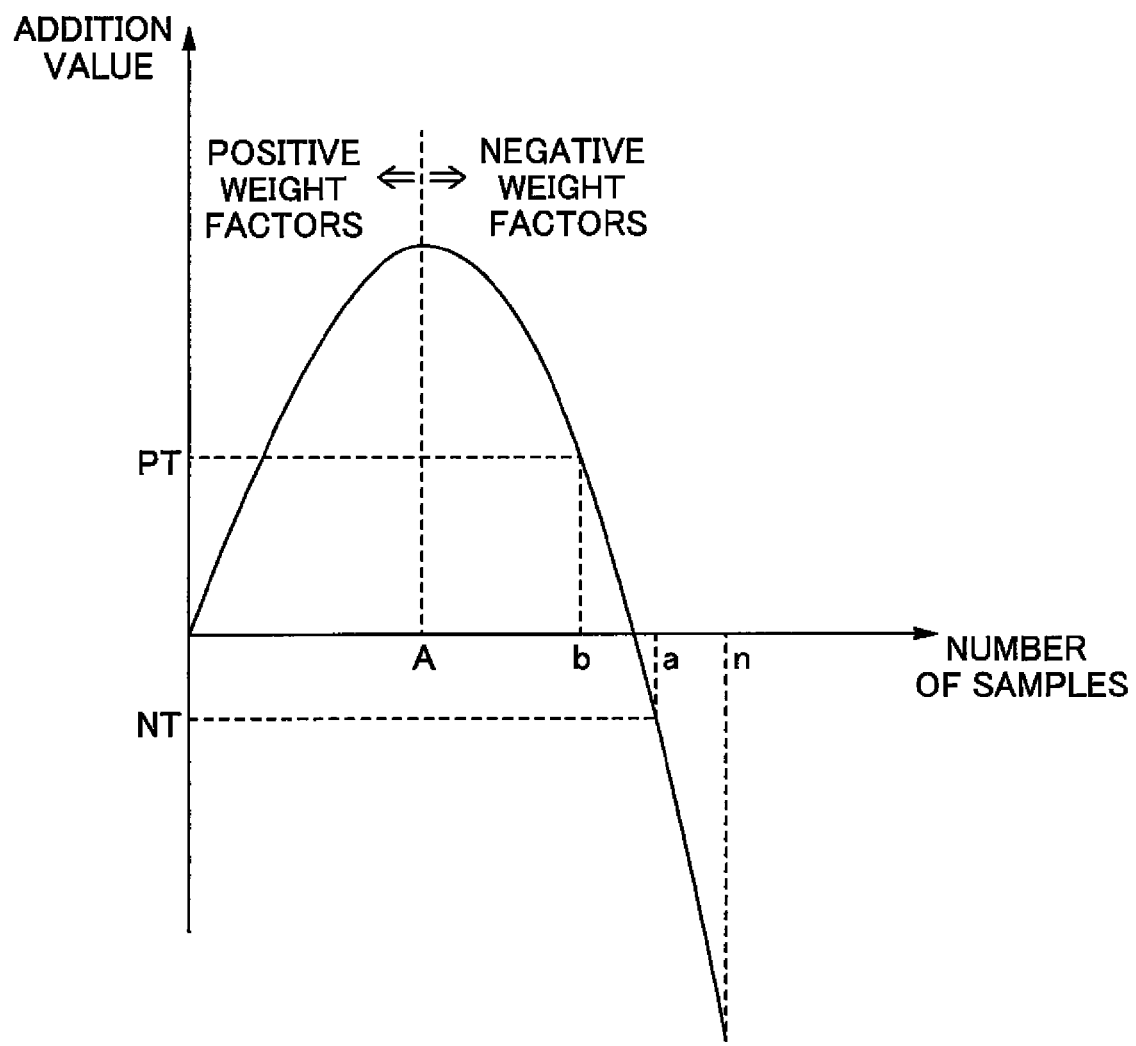
FIG. 21 is a diagram showing a relationship between the number of samples and addition values in a case where computation has been carried out in order of larger weight factors.

Next, description is given regarding a first embodiment of the invention with reference to FIGS. 19 to 21.

FIG. 19A and FIG. 19B are diagrams showing single examples of classification tables used in the calculations of support vector machines. FIG. 20 is a flowchart for describing classification processing involved in the first embodiment of the invention. FIG. 21 is a diagram showing one example of a relationship between the number of samples and addition values. In the following embodiment, it is assumed that classification processing is carried out in a sub-classifier 51 (for example, the landscape classifier 51L) of the overall classifier 50. It should be noted that FIG. 20 shows the flow of classification processing according to the invention in the area of the dashed dotted line of FIG. 7.

In each of the sub-classifiers 51, a support vector that contributes to a classification boundary is obtained through learning using learning samples based on a support vector machine. The support vector machine calculates a discriminant according to calculation of the aforementioned equation (1). That is, the kernel $k(x)$ of equation (2) calculated in accordance with a relationship between a characteristic amount ($y_{ij}$) of the support vector and a characteristic amount ($x_i$) of the classification target is multiplied by a weight factor ($w_i$), and that value (function value) is successively added. As shown in FIG. 19A, each of the support vectors used in this calculation and its corresponding weight factor are stored in the storing section 31 for example as a classification table.

In this embodiment, the sub-classifier 51 sorts the classification table of FIG. 19A into order of largest weight factor (from positive to negative) associating the weight factor with the characteristic amount of the support vector as shown in FIG. 19B. It should be noted that the computer or the like (not shown) in which the classification table is generated for example may be set to sort the classification table of FIG. 19A into order of largest weight factor. The generated classification table (FIG. 19B) may be stored in the storing section 31. In the first embodiment, at the time of calculating the discriminant using a support vector machine, the weight factor and the sample are selected in order from the larger side weight factors (upper side in the diagram) of the classification table of FIG. 19B.

At S202 in FIG. 7, in case that the sub-classifier 51 determines that it is a classification target scene (YES at S202), the sub-classifier 51 carries out a calculation using the support vector machine. First, zero is set (S501) as an initial value of the addition value (to be described later) as shown in FIG. 20. Then, based on the classification table of FIG. 19B, the sub-classifier 51 selects a corresponding sample (S502) in order from the positive side (upper side in the diagram) of the weight factors, and calculates a value of the kernel $k(x)$ using equation (2) (S503). In the case of FIG. 19B, the sample corresponding to the weight factor $w_S$ is initially selected, and the kernel $k(x)$ of the equation (2) is calculated using those characteristic amounts ($y_{S1}, y_{S2}, y_{S3} \ldots$). Then the sub-classifier 51 multiplies the kernel $k(x)$ by the weight factor ($w_i$), and the function value obtained by this multiplication is added to the addition value (S504).

Here, the kernel k(x) is always a positive value according to equation (2). Accordingly, the function value of multiplying the kernel k(x) by the weight factor is a positive value in case that the weight factor is positive and a negative value in case that the weight factor is negative. That is, in case that the weight factor is positive, the addition value becomes larger by carrying out addition, and in case that the weight factor is negative, the addition value becomes smaller by carrying out addition. As mentioned earlier, the weight factors are sorted in order from positive to negative, and therefore the addition values vary as shown in FIG. 21. That is, for positive weight factors, the addition values become larger along with increases in the number of samples, and when the weight factors are negative, the addition values become smaller along with increases in the number of samples.

FIG. 21 shows a relationship between addition values and the number of samples in a case where calculations are carried out in order of positive to negative weight factors. In FIG. 21, PT indicates the positive threshold, and in case that the value of the discriminant of the final addition value is larger than PT, the sub-classifier 51 classifies that the image to be classified pertains to the scene corresponding to that sub-classifier 51. On the other hand, in case that the value of the discriminant is PT or lower, the sub-classifier 51 cannot classify that the image to be classified pertains to the corresponding scene. Furthermore, as mentioned earlier, each of the sub-classifiers 51 classifies according to a first negative threshold that it does not pertain to the corresponding scene. In FIG. 21, NT indicates the first negative threshold, and if the value of the discriminant is smaller than NT, the sub-classifier 51 classifies that the image to be classified does not pertain to the corresponding scene. In FIG. 21, "A" indicates the number of samples when the sign of the weight factor switches, "b" indicates the number of samples when the addition value becomes smaller than the positive threshold (PT), "a" indicates the number of samples when the addition value becomes smaller than the first negative threshold (NT), and "n" (n>a) indicates the total number of samples.

The sub-classifier 51 determines whether or not the sign of the weight factor multiplied at S504 is negative (S505). In other words, it determines whether or not the function value to be obtained in calculation will be a negative value. Then, in case that it determines that the weight factor is negative (yes at S505), it carries out a determination as to whether or not the addition value is smaller than the first negative threshold (S506). As mentioned earlier, in case that the weight factor is negative, the addition value becomes smaller each time calculation is carried out, and therefore in case that the addition value is smaller than the first negative threshold, the value of the discriminant f(x) will not be larger than the first negative threshold. For this reason, in case that the addition value is smaller than the first negative threshold (yes at S506), the sub-classifier 51 classifies that the image to be classified does not pertain to the scene corresponding to that sub-classifier 51 (for example, a "landscape" scene) and sets a negative flag in the column for that scene (S207 in FIG. 7).

Furthermore, in case that it is determined at S506 that the addition value is equal to or more than the first negative threshold (no at S506), or in case that it is determined at S505 that the weight factor is positive (no at S505), the sub-classifier 51 carries out a determination as to whether or not there is a next sample (S509). In a case where it is determined that there is a next sample (yes at S509), S502 is executed, in which a sample is selected from the larger side weight factors of the classification table shown in FIG. 19B.

In case that it is determined that there is no next sample (no at S509), the sub-classifier 51 determines whether or not the value of the discriminant, which is the addition value thereof, is larger than the positive threshold (S510). In case that it is determined that the value of the discriminant is larger than the positive threshold (yes at S510), a positive flag is set in the column for that scene (S205 in FIG. 7) as the image to be classified pertains to the scene (for example, a "landscape" scene) corresponding to that sub-classifier 51. It should be noted that since the addition value is equal to or more than the first negative threshold from S506, the discriminant will be a value equal to or more than the first negative threshold, and it is not necessary to carry out a comparison of the discriminant and the first negative threshold. For this reason, in case that it is determined that the value of the discriminant is equal to or less than the positive threshold or less (no at S510), the sub-classifier 51 cannot determine that it is a corresponding scene, and a determination is carried out as to whether or not there is a next sub-classifier 51 (S208 in FIG. 7).

By doing this, in case that the addition values vary as in FIG. 21 for example, it can be classified from addition results up to an "a" amount of samples that the image to be classified is not a scene corresponding to the sub-classifier 51. In other words, arithmetic processing for the remaining (n–a) number of samples can be omitted. This enables the speed of classification processing of the sub-classifier 51 to be improved.

Furthermore, when the weight factor is negative (the function value is negative), a determination is carried out as to whether or not the addition value is smaller than the first negative threshold, and therefore even if the addition value is smaller than the first negative threshold at a point in time when the function value to be added is positive, it is not classified that the image to be classified does not pertain to the corresponding scene. This enables classification processing to be carried out reliably.

It should be noted that in having the sub-classifier 51 sort the classification table, in case that this is set so that the weight factors having negative signs are sorted in order of larger absolute values, immediately after the weight factors switch from positive to negative, adding is performed from function values having large absolute values so that the amount of variation in the addition values becomes large. Thus, the computation until the added value reaches the first negative threshold (the number of times of adding) is reduced, and the speed of classification processing can be further improved.

Second Embodiment

As described in the first embodiment, when the sub-classifier 51 carries out calculation of the discriminant in order of largest weight factors (in order from positive to negative) based on the classification table of FIG. 19B, the addition values become smaller along with increases in the number of samples in case that the weight factor is negative. Due to this, in a case where the addition value becomes equal to or lower than the positive threshold midway during calculation of the discriminant, it can be determined that the image to be classified cannot be classified as pertaining to the scene corresponding to the sub-classifier 51.

Figure 22:
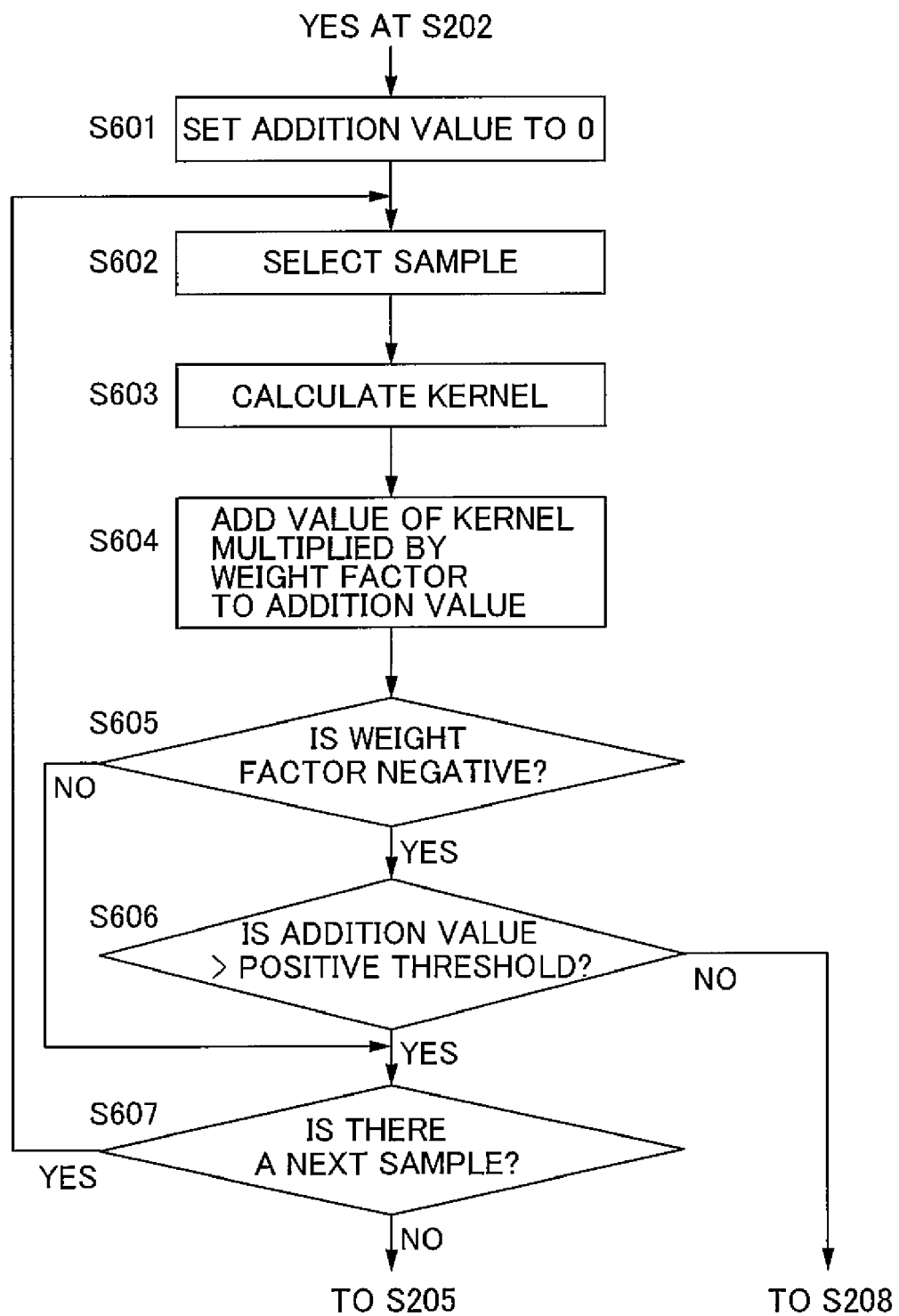
FIG. 22 is a flowchart for describing classification processing according to a second embodiment of the invention.

FIG. 22 is a flowchart for describing classification processing involved in a second embodiment of the invention. S601 to S605 in FIG. 22 correspond to S501 to S505 in FIG. 20 and the same processing is carried out respectively. Accordingly, description of those portions is omitted and description is given regarding processing from S605 onward. It should be noted that the sub-classifier 51 selects samples in order of largest weight factors (in order from positive to negative) based on the classification table of FIG. 19B in a same manner as in the first embodiment.

At S605, where a determination is carried out as to whether or not the weight factor is negative, when the sub-classifier 51 has determined that the weight factor is negative (yes at S605), it then carries out a determination as to whether or not the addition value is larger than the positive threshold (S606). As mentioned earlier, in case that the weight factor is negative, the addition value becomes smaller each time calculation is carried out, and therefore in case that the addition value becomes equal to or lower than the positive threshold, the value of the discriminant will not be larger than the positive threshold. For this reason, in case that the addition value is equal to or lower than the positive threshold (no at S606), the sub-classifier 51 determines that the image to be classified cannot be classified as pertaining to the scene corresponding to that sub-classifier 51 (for example, a "landscape" scene) and carries out a determination as to whether or not there is a next sub-classifier 51 (S208 in FIG. 7). In other words, at a point in time when the addition value becomes equal to or lower than the positive threshold, classification processing by that sub-classifier 51 finishes.

On the other hand, in case that it is determined at S606 that the addition value is larger than the positive threshold (yes at S606), or in case that it is determined at S605 that the weight factor is positive (no at S605), the sub-classifier 51 carries out a determination as to whether or not there is a next sample (S607). In case that it is determined that there is a next sample (yes at S607), S602 is executed in which that sample is selected.

In case that it is determined that there is no next sample (no at S607), the sub-classifier 51 sets a positive flag in the column for that scene (S205 in FIG. 7) as the image to be classified pertains to the scene (for example, a "landscape" scene) corresponding to that sub-classifier 51.

In the second embodiment, by calculating samples up to the "b" amount shown in FIG. 21, it is determined that the image to be classified cannot be classified as pertaining to the scene corresponding to that classification processing, and the classification processing thereby finishes. Thus, classification processing for an (n−b) number of samples can be omitted. It should be noted that the positive threshold is a larger value than the first negative threshold, and the addition value becomes smaller along with increases in the number of samples in case that the weight factor is negative, and therefore b<a. In other words, the number of times of computation is reduced more than the first embodiment, in which computation of an (n−a) amount is omitted, and therefore the speed of classification processing can be further improved.

Figure 23:
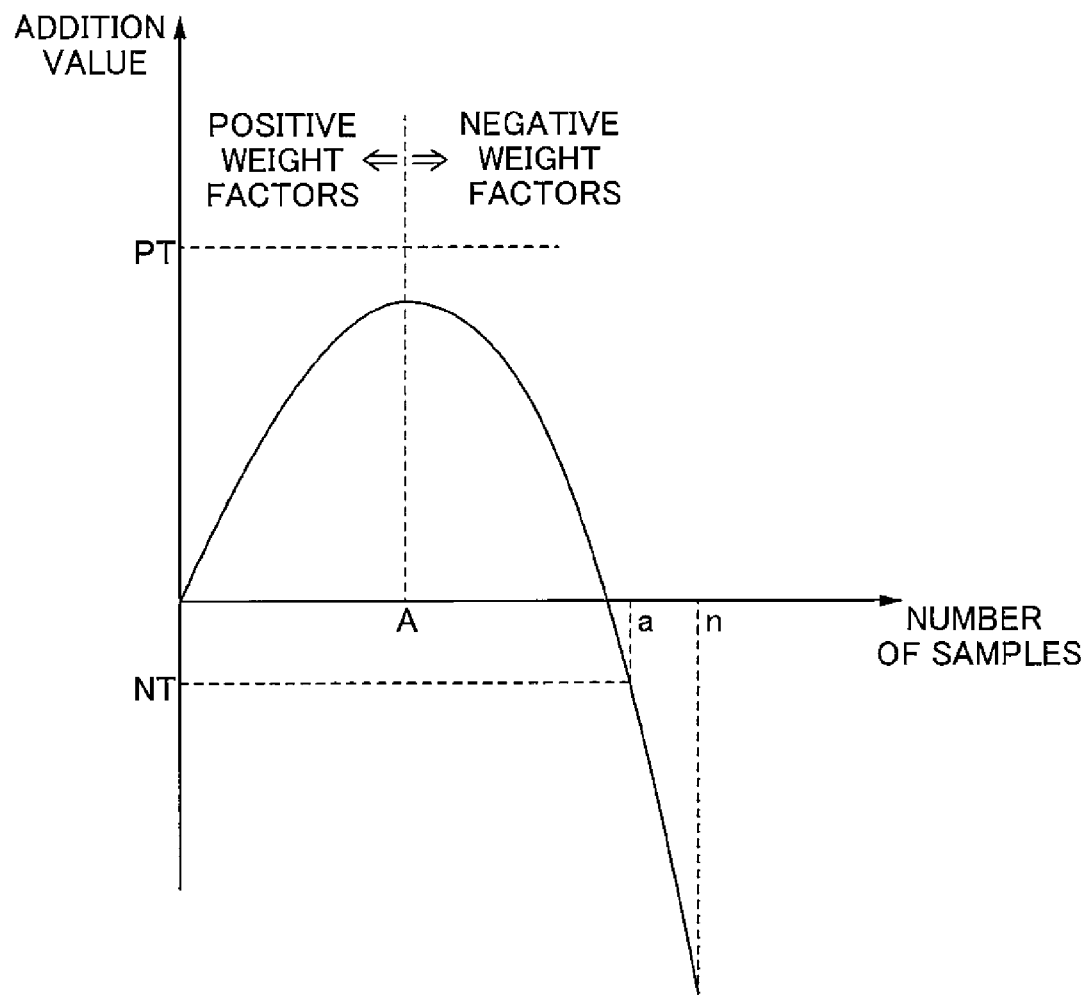
FIG. 23 is a diagram showing a relationship between addition values and the number of samples.

In particular, as shown in FIG. 23, when the addition value peaks (at "A" where the weight factor switches from positive to negative), in case that the addition value has not reached the positive threshold, the calculation for all the samples of negative weight factors can be omitted, and the classification processing can be carried out at an even greater speed.

However, in the second embodiment, at the point in time where the addition value becomes equal to or lower than the positive threshold in case that the weight factor is negative, the calculation of the discriminant for that scene is discontinued and therefore a discriminant value is not calculated. Thus, that scene becomes unable to be excluded by the first negative threshold (S207, in which a negative flag is set, cannot be executed). Furthermore, integrative classification processing, in which most highly reliable scene is selected based on the values of discriminants of each of the sub-classifiers 51, becomes unable to be carried out. In this case, for example, the integrative classifier 70 is set to classify this as an "other" scene.

With the classification processing according to the second embodiment, greater speeds of classification processing can be achieved in each of the sub-classifiers 51 than in the first embodiment, which enables a faster advancement to later stages of classification processing.

Furthermore, when the weight factor is negative (the function value is negative), a determination is carried out as to whether or not the addition value is smaller than the positive threshold, and therefore even if the addition value is smaller than the positive threshold at a point in time when the function value to be added is positive, it is not classified that the image to be classified cannot be considered to be pertaining to the corresponding scene. This enables classification processing to be carried out reliably.

It should be noted that in calculations for samples whose weight factor is negative, when the calculations are set to be carried out in order of weight factors having larger absolute values, immediately after the weight factors switch from positive to negative, adding is performed from function values having large absolute values such that the amount of variation in the addition values becomes large. Thus, the computation until the added value becomes equal to or lower than the positive threshold is reduced, and the speed of classification processing can be further improved.

Third Embodiment

In the first embodiment and the second embodiment, the sub-classifiers 51 carried out computation of the discriminants in order of larger weight factors (in order from positive to negative) for each of the samples, but in a third embodiment, this is carried out in order of smaller weight factors (in order from negative to positive).

Figure 24:
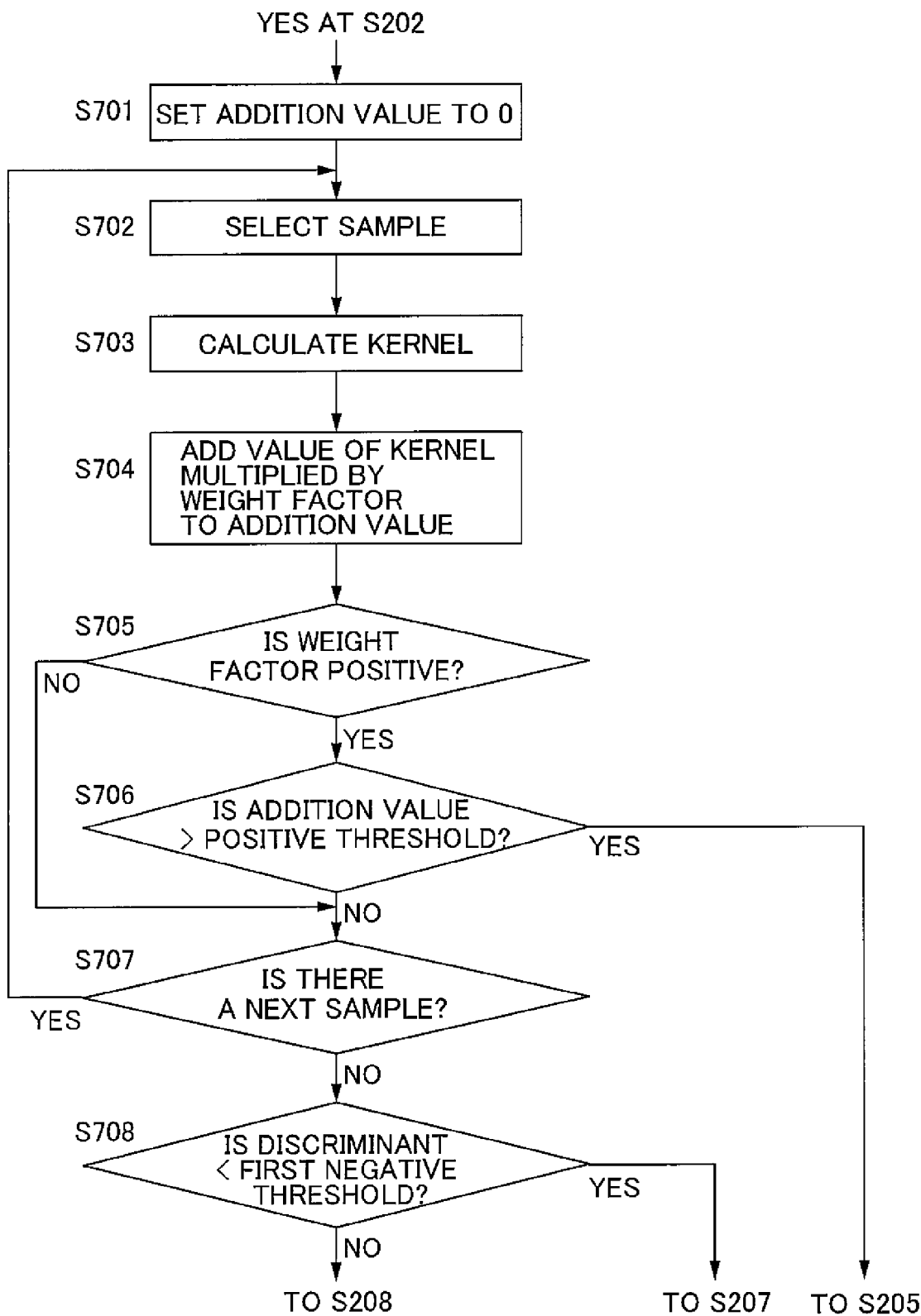
FIG. 24 is a flowchart for describing classification processing according to a third embodiment of the invention.
Figure 25:
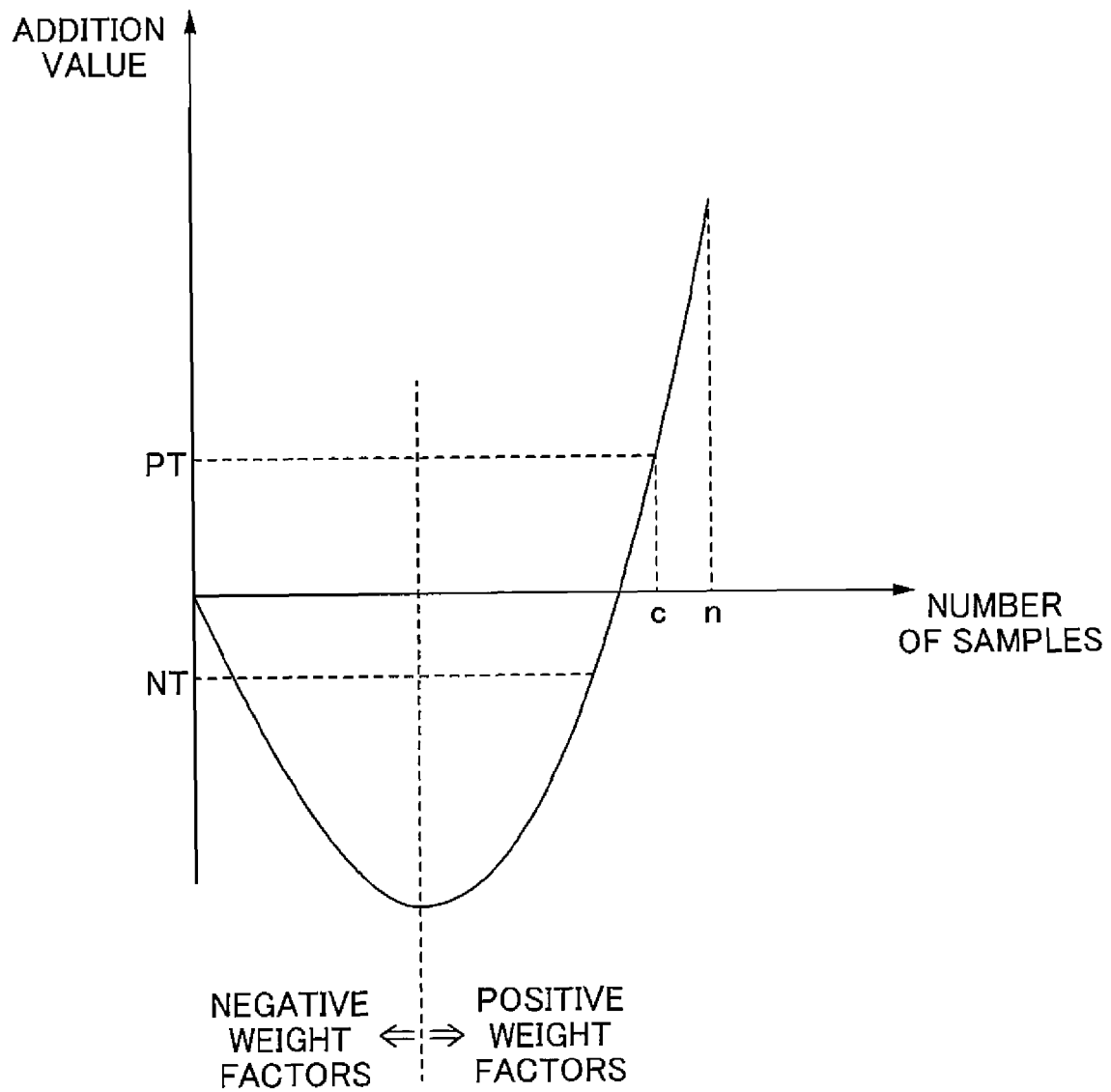
FIG. 25 is a diagram showing a relationship between the number of samples and addition values in a case where computation has been carried out in order of smaller weight factors.

FIG. 24 is a flowchart for describing classification processing according to the third embodiment of the invention. Furthermore, FIG. 25 is a diagram showing one example of a relationship between the number of samples and addition values in case that computation of the discriminant has been carried out in order of smaller weight factors. In the third embodiment, the sub-classifier 51 selects samples from smaller side weight factors (lower side in the diagram) using the classification table of FIG. 19B. It should be noted that this may also be configured so that the sub-classifier 51 for example sorts the classification table of FIG. 19A into order of smaller weight factors (in order from negative to positive) and selects samples in order from smaller weight factors based on that classification table (not shown).

At S202 in FIG. 7, the sub-classifier 51 determines that it is a classification target scene (YES at S202) and carries out a calculation using the support vector machine. First, zero is set (S701) as an initial value of the addition value as shown in FIG. 24. Then, the sub-classifier 51 selects corresponding samples (S702) in order from smaller side weight factors in the classification table of FIG. 19B (lower side in the diagram), and calculates a value of the kernel k(x) using equation (2) (S703). Then the sub-classifier 51 multiplies the kernel k(x) by the weight factor ($w_i$), and the function value obtained by this multiplication is added to the addition value (S704).

As described earlier, this function value is a positive value in case that the weight factor is positive and a negative value in case that the weight factor is negative. Furthermore, since the samples are selected in order from smaller weight factors (in order from negative to positive), the addition values vary as shown in FIG. 25. That is, for negative weight factors, the addition values become smaller along with increases in the number of samples, and when the weight factors are positive, the addition values become larger along with increases in the number of samples. It should be noted that in FIG. 25, the number of samples when the addition value becomes larger than the positive threshold is indicated by "c," and the total number of samples is indicated by "n" (n>c).

The sub-classifier 51 determines whether or not the sign of the weight factor is positive (S705). Then, in case that it determines that the weight factor is positive (yes at S705), it carries out a determination as to whether or not the addition value is greater than the positive threshold (S706). In case that the weight factor is positive, the addition value becomes larger each time calculation is carried out, and therefore in case that the addition value becomes larger than the positive threshold, the value of the discriminant will not become equal to or less than the positive threshold. Accordingly, in case that the sub-classifier 51 determines that the addition value is larger than the positive threshold (yes at S706), it sets a positive flag in the column for that scene (S205 in FIG. 7) as the image to be classified pertains to the scene (for example, a "landscape" scene) corresponding to that sub-classifier 51.

Furthermore, in case that it is determined at S706 that the addition value is equal to or less than the positive threshold (no at S706), or in case that it is determined at S705 that the weight factor is negative (no at S705), the sub-classifier 51 carries out a determination as to whether or not there is a next sample (S707). In case that it is determined that there is a next sample (yes at S707), S702 is executed in which that sample is selected.

In case that it is determined that there is no next sample (no at S707), the sub-classifier 51 determines whether or not the addition value (the value of the discriminant) is smaller than the first negative threshold (S708). In case that it is determined that the value of the discriminant is smaller than the first negative threshold (yes at S708), the sub-classifier 51 sets a negative flag in the column for that scene (S207 in FIG. 7) as the image to be classified does not pertain to the scene (for example, a "landscape" scene) corresponding to that sub-classifier 51. On the other hand, in case that it is determined that the value of the discriminant is equal to or larger the first negative threshold (no at S708), the scene cannot be specified, and a determination is carried out as to whether or not there is a next sub-classifier 51 (S208 in FIG. 7).

In this way, in the third embodiment, by carrying out calculations in order from smaller weight factors, the image to be classified can be classified as pertaining to the scene corresponding to that classification processing at a point in time when calculation up to the number of samples indicated by "c" in FIG. 25 has finished. Thus, calculations for the remaining number of samples (n−c) can be omitted, thereby enabling the speed of classification processing to be improved.

Furthermore, when the weight factor is positive (the function value is positive), a determination is carried out as to whether or not the addition value is larger than the positive threshold, and therefore even if the addition value is larger than the positive threshold at a point in time when the function value to be added is negative for example, the image to be classified is not classified as pertaining to the corresponding scene. This enables classification processing to be carried out reliably.

It should be noted that in calculations for samples whose weight factor is positive, when the calculations are set to be carried out in order of weight factors having larger values, immediately after the weight factors switch from negative to positive, adding is performed from function values having large values in such a manner that the amount of variation in the addition values becomes large. Thus, the number of times of calculations until the added value exceeds the positive threshold can be reduced, and the speed of classification processing can be further improved.

Fourth Embodiment

In the above-described embodiments, description was given regarding classification processing in the sub-classifiers 51 of the overall classifier 50, but in the case of the sub-partial classifiers 61 of the partial classifier 60, classification (partial classification processing) is carried out using support vector machines for each partial image. In partial classification processing, classification is performed for each partial image as to whether or not it pertains to a specific scene based on a partial characteristic amount of the partial images. Specifically, the sub-partial classifiers 61 classify that the partial image pertains to the corresponding scene if the calculated discriminant value is positive and classifies that the partial image does not pertain to the corresponding scene if this is negative. That is, in partial classification processing, the classification target of the support vector machine is a partial image and the threshold of the classification is zero. In case that a number (count number) of partial images whose discriminant value is positive has exceeded a positive threshold, that (overall) image is classified as pertaining to the corresponding scene.

In the case of this partial classification processing, the same processing can be carried out for each partial image as in the above-described classification processing.

For example, in a same manner as in the first embodiment and the second embodiment, by having the sub-partial classifiers 61 generate a classification table (not shown) in which weight factors are sorted in order of size (in order from positive to negative) and carry out calculations of the discriminants from larger side weight factors according to the classification table, it can be classified that partial image does not pertain to the corresponding scene at a point in time when the addition value becomes negative.

Alternatively, in a same manner as the third embodiment, by having the sub-partial classifiers 61 carry out calculations from smaller side weight factors, it can be classified that the partial image pertains to the corresponding scene at a point in time when the addition value becomes positive.

In this way, classification for each partial image can be quickly discontinued, and the processing speeds in partial classification processing, which tend to take time in classification, can be improved.

Other Embodiments

The foregoing embodiments were described with regard to a case of carrying out classification processing of a scene in an image for the printer 4 as one embodiment, but the foregoing embodiments are for the purpose of elucidating the invention and are not to be interpreted as limiting the invention. The invention can of course be altered and improved without departing from the gist thereof and includes functional equivalents.

For example, classification targets for classification processing according to the invention are not limited to images. That is, any classification target is possible as long as it can be classified into a plurality of categories according to classification using support vector machines.

Although the preferred embodiment of the invention has been described in detail, it should be understood that various changes, substitutions and alterations can be made therein without departing from spirit and scope of the inventions as defined by the appended claims.

What is claimed is:

1. A category classification method, comprising:

calculating function values corresponding to a relationship between a classification target and support vectors that contribute to a classification boundary, calculating an addition value in which the function value for each support vector has been added, wherein calculation of the addition value is carried out by adding function values having positive values, then adding function values having negative values until the addition value becomes smaller than a threshold, or no more function values remain, and the classification target is classified as not pertaining to the specific category in case that the addition value has become smaller than the threshold.

2. A category classification method according to claim 1, wherein a determination is performed as to whether or not the function value to be added to the addition value is a negative value, and the classification target is classified as not pertaining to the specific category in case that the function value is a negative value and the addition value has become smaller than the threshold.

3. A category classification method according to claim 1, wherein the function values having negative values are added to the addition value in order from those having larger absolute values.

4. A category classification method, comprising:

calculating function values corresponding to a relationship between a classification target and support vectors that contribute to a classification boundary, calculating an addition value in which the function value for each support vector has been added, wherein calculation of the addition value is carried out by adding function values having positive values, then adding function values having negative values until the addition value becomes smaller than or equal to a threshold, or no more function values remain, and classifying that the classification target pertains to a specific category in case that the addition value is larger than a threshold after all negative function values have been added, and it is determined that the classification target cannot be classified as pertaining to the specific category in case that the addition value has become equal to or lower than the threshold.

5. A category classification method according to claim 4, wherein a determination is performed as to whether or not the function value to be added to the addition value is a negative value, and a determination is made that the classification target cannot be classified as pertaining to the specific category in case that the function value is a negative value and the addition value has become equal to or less than the threshold.

6. A category classification method according to claim 4, wherein the function values having negative values are added to the addition value in order from those having larger absolute values.

7. A category classification method, comprising:

calculating function values corresponding to a relationship between a classification target and support vectors that contribute to a classification boundary, calculating an addition value in which the function value for each support vector has been added, wherein calculation of the addition value is carried out by adding function values having negative values, then adding function values having positive values until the addition value becomes greater than a threshold or no more function values remain, and the classification target is classified as pertaining to the specific category in case that the addition value has become larger than the threshold.

8. A category classification method according to claim 7, wherein a determination is performed as to whether or not the function value to be added to the addition value is a positive value, and the classification target is classified as pertaining to the specific category in case that the function value is a positive value and the addition value has become larger than the threshold.

9. A category classification method according to claim 7, wherein the function values having positive values are added to the addition value in order from those having larger values.

* * * * *